United States Patent
Shi et al.

(10) Patent No.: US 11,510,186 B2
(45) Date of Patent: Nov. 22, 2022

(54) UPLINK CONTROL CHANNEL RESOURCE CONFIGURATION METHOD AND APPARATUS

(71) Applicant: HUAWEI TECHNOLOGIES CO., LTD., Guangdong (CN)

(72) Inventors: Jie Shi, Shenzhen (CN); Xingwei Zhang, Lund (SE); Zhe Liu, Shenzhen (CN); Yan Cheng, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 35 days.

(21) Appl. No.: 16/874,343

(22) Filed: May 14, 2020

(65) Prior Publication Data
US 2020/0275437 A1    Aug. 27, 2020

Related U.S. Application Data

(63) Continuation of application No. PCT/CN2018/105829, filed on Sep. 14, 2018.

(30) Foreign Application Priority Data

Nov. 17, 2017 (CN) .......................... 201711148424.2

(51) Int. Cl.
  *H04W 4/00* (2018.01)
  *H04W 72/04* (2009.01)
  *H04B 1/713* (2011.01)

(52) U.S. Cl.
  CPC ........ *H04W 72/0413* (2013.01); *H04B 1/713* (2013.01)

(58) Field of Classification Search
  CPC ..................... H04B 1/713; H04W 72/0413
  See application file for complete search history.

(56) References Cited

U.S. PATENT DOCUMENTS

| 2016/0095105 A1* | 3/2016 | Chen ............... H04L 1/1861 370/329 |
| 2017/0238313 A1 | 8/2017 | Wang et al. |
| 2019/0036665 A1* | 1/2019 | Park ................. H04L 5/0051 |

FOREIGN PATENT DOCUMENTS

| CN | 101686560 A | 3/2010 |
| CN | 101815325 A | 8/2010 |

(Continued)

OTHER PUBLICATIONS

Office Action issued in Japanese Application No. 2020-527763 dated May 31, 2021, 9 pages (with English translation).

(Continued)

*Primary Examiner* — Bo Hui A Zhu
(74) *Attorney, Agent, or Firm* — Fish & Richardson P.C.

(57) ABSTRACT

Embodiments of the present disclosure relate to the field of communications technologies, and provide an uplink control channel resource configuration method and an apparatus, to improve utilization of a frequency domain resource of an uplink channel. The method includes: determining, by a base station, resource configuration information, and sending, by the base station, the resource configuration information to UE, where the resource configuration information includes a first hop resource of a first uplink control channel (PUCCH), a frequency domain resource offset of the first PUCCH, and/or a bandwidth of a bandwidth part (BWP) used by the user equipment UE, and the first PUCCH is a PUCCH of the UE.

6 Claims, 7 Drawing Sheets

(56) References Cited

FOREIGN PATENT DOCUMENTS

| CN | 107113076 A | 8/2017 |
|---|---|---|
| KR | 20160018284 A | 2/2016 |
| WO | 2013042944 A1 | 3/2013 |
| WO | 2017078458 A1 | 5/2017 |

OTHER PUBLICATIONS

Huawei, HiSilicon, "Resource allocation for PUCCH," 3GPP TSG RAN WG1 Meeting #90bis, R1-1717073, Prague, Czech Republic, Oct. 9-13, 2017, 7 pages.

Motorola Mobility et al., "PUCCH resource allocation," 3GPP TSG RAN WG1 #90bis Prague, R1-1718702, Czech Republic, Oct. 9-13, 2017, 6 pages.

Office Action issued in Chinese Application No. 201711148424.2 dated May 21, 2021, 12 pages (with English translation).

Office Action in Indian Application No. 202037022697, dated Jun. 26, 2021, 6 pages.

3GPP TS 38.212 V1.0.0 (Sep. 2017), "3rd Generation Partnership Project; Technical Specification Group Radio Access Network; NR; Multiplexing and channel coding (Release 15)," Sep. 2017, 28 pages.

3GPP TS 38.213 V1.0.0 (Sep. 2017), "3rd Generation Partnership Project;Technical Specification Group Radio Access Network; NR; Physical layer procedures for control (Release 15)," Sep. 2017, 6 pages.

3GPP TS 38.321 V1.1.0 (Nov. 2017), "3rd Generation Partnership Project; Technical Specification Group Radio Access Network; NR; Medium Access Control (MAC) protocol specification (Release 15)," Nov. 2017, 64 pages.

3GPP TS 38.331 V0.1.0 (Oct. 2017), 3rd Generation Partnership Project;Technical Specification Group Radio Access Network; NR;Radio Resource Control (RRC); Protocol specification (Release 15), Oct. 2017, 154 pages.

Huawei, HiSilicon:"Long PUCCH for UCI of up to 2 bits", 3GPP TSG RAN WG1 Meeting AH_NR#3, R1-1715402, Nagoya, Japan, Sep. 18-21, 2017. total 6 pages.

Huawei, HiSilicon, "Structure of 1-symbol PUCCH for more than 2bits," 3GPP TSG RAN WG1 Meeting #89, R1-1706951, Hangzhou, China, May 15-19, 2017, 4 pages.

Oppo, "Resource allocation for PUCCH," 3GPP TSG RAN WG1 Meeting 90bis, R1-1718047, Prague, CZ, Oct. 9-13, 2017, 7 pages.

PCT International Search Report and Written Opinion issued in International Application No. PCT/CN2018/105829 dated Nov. 29, 2018, 15 pages (with English translation).

Samsung, "Resource Allocation for PUCCH Transmission," 3GPP TSG RAN WG1 Meeting 90bis, R1-1717655, Prague, CZ, Oct. 9-13, 2017, 4 pages.

ZTE, "sPUCCH Resource Management," 3GPP TSG RAN WG1 Meeting #89, R1-1707280, Hangzhou, P.R. China, May 15-19, 2017, 7 pages.

Ericsson, "On the Design of Long PUCCH for up to 2 bits," 3GPP TSG RAN WG1 Meeting#90bis, R1-1718635, Prague, Czech Republic, Oct. 9-13, 2017, 15 pages.

Extended European Search Report issued in European Application No. 18877434.3 dated Dec. 14, 2020, 9 pages.

Intel Corporation, "2-symbol NR PUCCH," 3GPP TSG RAN WG1 Meeting 90bis, R1-1717384, Prague, CZ, Oct. 9-13, 2017, 4 pages.

* cited by examiner

UPLINK CONTROL CHANNEL RESOURCE CONFIGURATION METHOD AND APPARATUS

CROSS-REFERENCE TO RELATED APPLICATIONS

This application is a continuation of International Application No. PCT/CN2018/105829, filed on Sep. 14, 2018, which claims priority to Chinese Patent Application No. 201711148424.2, filed on Nov. 17, 2017. The disclosures of the aforementioned applications are hereby incorporated by reference in their entireties.

TECHNICAL FIELD

Embodiments of the present disclosure relate to the field of communications technologies, and in particular, to an uplink control channel resource configuration method and an apparatus.

BACKGROUND

In a new radio (NR) system (also referred to as a 5G system), resource allocation for an uplink control channel (PUCCH) becomes more flexible.

Currently, in a process of allocating a frequency domain resource for a PUCCH, for a PUCCH on which frequency hopping may occur in one slot, a frequency domain resource may be allocated to the PUCCH based on a bandwidth part (BWP) used by user equipment (UE). Specifically, for UEs configured with a same BWP, such as UE 1 and UE 2, for example, frequency hopping occurs twice on a PUCCH 1 of the UE 1 and a PUCCH 2 of the UE 2 in one slot. A first-hop frequency domain resource of the PUCCH 1 is different from a first-hop frequency domain resource of the PUCCH 2, and a same frequency hopping range (where the frequency hopping range is a distance between a second-hop frequency domain resource of a PUCCH and a first-hop frequency domain resource of the PUCCH) may be configured for the PUCCH 1 and the PUCCH 2. For example, n ($0 \leq n \leq 1$) times of a BWP used by the UE 1 or the UE 2 may be used, that is, n×BWP are used as the frequency hopping range for the PUCCH 1 and the PUCCH 2. In this way, a conflict between a frequency domain resource of the PUCCH 1 after frequency hopping occurs (that is, a second-hop frequency domain resource) and a second-hop frequency domain resource of the PUCCH 2 can be avoided. FIG. 1 is a schematic diagram of frequency hopping of a PUCCH 1 and a PUCCH 2, where the frequency hopping is performed by using 0.5×BWP as a frequency hopping range.

However, in the foregoing method, the second-hop frequency domain resource of the PUCCH 1 and the second-hop frequency domain resource of the PUCCH 2 may interrupt the entire BWP, causing a plurality of PUCCH fragments. Consequently, frequency domain resources used for an uplink shared channel (physical uplink shared channel, PUSCH) are discontiguous, and efficient information transmission cannot be implemented on the PUSCH. This results in comparatively low utilization of a frequency domain resource.

SUMMARY

This application provides an uplink control channel resource configuration method and an apparatus, to improve utilization of a frequency domain resource of an uplink channel.

To achieve the foregoing objective, the following technical solutions are used in this application.

According to a first aspect, an uplink control channel resource configuration method is provided. The method may include: determining, by a base station, resource configuration information, and sending, by the base station, the resource configuration information to UE, where the resource configuration information includes a first hop resource of a first uplink control channel PUCCH, a frequency domain resource offset of the first PUCCH, and/or a bandwidth of a BWP used by the UE, and the first PUCCH is a PUCCH of the UE.

According to the uplink control channel resource configuration method provided in this application, the base station may determine the resource configuration information that includes the first hop resource of the first PUCCH, the frequency domain resource offset of the first PUCCH, and/or the bandwidth of the BWP used by the UE, and send the resource configuration information to the UE, where the first PUCCH is a PUCCH of the UE. In comparison with the prior art, because the base station may configure the frequency domain resource offset of the first PUCCH and/or the bandwidth of the BWP used by the UE for the first PUCCH, the UE may determine a second hop resource of the first PUCCH based on the frequency domain resource offset of the first PUCCH and/or the bandwidth of the BWP used by the UE, so that a frequency domain resource of the first PUCCH may be distributed at two ends of the BWP of the UE. It is ensured that frequency domain resources of a PUSCH are contiguous to some extent, thereby improving utilization of a frequency domain resource of an uplink channel.

In a first optional implementation of the first aspect, the base station sends the frequency domain resource offset of the first PUCCH to the UE by using any one of the following manners:

the base station sends the frequency domain resource offset of the first PUCCH to the UE by using a broadcast message, a system message, or radio resource control (RRC) signaling.

the base station sends the frequency domain resource offset of the first PUCCH to the UE by using downlink control information (DCI):

the base station sends the frequency domain resource offset of the first PUCCH to the UE by using a media access control control element (MAC CE);

the base station sends a set of frequency domain resource offsets to the UE by using a broadcast message, a system message, or RRC signaling, and sends indication information of the frequency domain resource offset of the first PUCCH to the UE by using DCI, where the set of frequency domain resource offsets includes at least one candidate frequency domain resource offset;

the base station sends a set of frequency domain resource offsets to the UE by using a broadcast message, a system message, or RRC signaling, and sends indication information of the frequency domain resource offset of the first PUCCH to the UE by using a MAC CE, where the set of frequency domain resource offsets includes at least one candidate frequency domain resource offset;

the base station sends indication information of the frequency domain resource offset of the first PUCCH to the UE by using DCI, where the indication information of the frequency domain resource offset of the first PUCCH is used to indicate the frequency domain resource offset of the first PUCCH in a set of frequency domain resource offsets, the set of frequency domain resource offsets includes at least one candidate frequency domain resource offset, and the set of the frequency domain resource offsets is preconfigured on the UE; or the base station sends indication information of the frequency domain resource offset of the first PUCCH to the UE by using a MAC CE, where the indication information of the frequency domain resource offset of the first PUCCH is used to indicate the frequency domain resource offset of the first PUCCH in a set of frequency domain resource offsets, the set of frequency domain resource offsets includes at least one candidate frequency domain resource offset, and the set of the frequency domain resource offsets is preconfigured on the UE.

In this application, the base station may send the frequency domain resource offset of the first PUCCH to the UE in the foregoing several manners. In this way, the base station can provide the frequency domain resource offset of the first PUCCH for the UE more flexibly.

According to a second aspect, an uplink control channel resource configuration method is provided. The method may include: obtaining, by UE, resource configuration information, and determining, by the UE, a second hop resource of a first PUCCH based on the resource configuration information, where the resource configuration information includes a first hop resource of the first PUCCH, a frequency domain resource offset of the first PUCCH, and/or a bandwidth of a BWP used by the UE, and the first PUCCH is a PUCCH of the UE.

For a description of the technical effects of the second aspect, refer to the description of the technical effects of the first aspect. Details are not described herein again.

In a first optional implementation of the second aspect, the method for determining, by the UE, a second hop resource of the first PUCCH based on the resource configuration information may specifically include: determining, by the UE, the second hop resource of the first PUCCH based on the first hop resource of the first PUCCH and/or the frequency domain resource offset of the first PUCCH and according to one of a rule 1, a rule 2, and a rule 3.

In this application, the UE may determine the second hop resource of the first PUCCH according to one of the three rules provided above, to implement frequency hopping based on the second hop resource.

In a second optional implementation of the second aspect, the UE obtains the frequency domain resource offset of the first PUCCH by using any one of the following manners:

the UE receives, by using a broadcast message, a system message, or RRC signaling, the frequency domain resource offset that is of the first PUCCH and that is sent by a base station;

the UE receives, by using DCI, the frequency domain resource offset that is of the first PUCCH and that is sent by a base station;

the UE receives, by using a MAC CE, the frequency domain resource offset that is of the first PUCCH and that is sent by a base station;

the UE receives, by using a broadcast message, a system message, or an RRC signaling, a set of frequency domain resource offsets that is sent by a base station, and receives, by using DCI, indication information that is of the frequency domain resource offset of the first PUCCH and that is sent by the base station, where the set of frequency domain resource offsets includes at least one candidate frequency domain resource offset;

the UE receives, by using a broadcast message, a system message, or RRC signaling, a set of frequency domain resource offsets that is sent by a base station, and receives, by using a MAC CE, indication information that is of the frequency domain resource offset of the first PUCCH and that is sent by the base station, where the set of frequency domain resource offsets includes at least one candidate frequency domain resource offset;

the UE receives, by using DCI, indication information that is of the frequency domain resource offset of the first PUCCH and that is sent by a base station, where the indication information of the frequency domain resource offset of the first PUCCH is used to indicate the frequency domain resource offset of the first PUCCH in a set of frequency domain resource offsets, the set of frequency domain resource offsets includes at least one candidate frequency domain resource offset, and the set of the frequency domain resource offsets is preconfigured on the UE: or the UE receives, by using a MAC CE, indication information that is of the frequency domain resource offset of the first PUCCH and that is sent by a base station, where the indication information of the frequency domain resource offset of the first PUCCH is used to indicate the frequency domain resource offset of the first PUCCH in a set of frequency domain resource offsets, the set of frequency domain resource offsets includes at least one candidate frequency domain resource offset, and the set of the frequency domain resource offsets is preconfigured on the UE.

According to a third aspect, a base station is provided. The base station may include a determining module and a sending module. The determining module may be configured to determine resource configuration information, where the resource configuration information includes a first hop resource of a first PUCCH, a frequency domain resource offset of the first PUCCH, and/or a bandwidth of a BWP used by UE, and the first PUCCH is a PUCCH of the UE. The sending module may be configured to send the resource configuration information to the UE.

In a first optional implementation of the third aspect, the sending module is specifically configured to perform at least one of the following operations:

sending the frequency domain resource offset of the first PUCCH to the UE by using a broadcast message, a system message, or radio resource control RRC signaling;

sending the frequency domain resource offset of the first PUCCH to the UE by using DCI:

sending the frequency domain resource offset of the first PUCCH to the UE by using a MAC CE;

sending a set of frequency domain resource offsets to the UE by using a broadcast message, a system message, or RRC signaling, and sending indication information of the frequency domain resource offset of the first PUCCH to the UE by using DCI, where the set of frequency domain resource offsets includes at least one candidate frequency domain resource offset;

sending a set of frequency domain resource offsets to the UE by using a broadcast message, a system message, or RRC signaling, and sending indication information of the frequency domain resource offset of the first PUCCH to the UE by using a MAC CE, where the set of frequency domain resource offsets includes at least one candidate frequency domain resource offset:

sending indication information of the frequency domain resource offset of the first PUCCH to the UE by using DCI, where the indication information of the frequency domain resource offset of the first PUCCH is used to indicate the frequency domain resource offset of the first PUCCH in a set of frequency domain resource offsets, the set of frequency domain resource offsets includes at least one candidate frequency domain resource offset, and the set of the frequency domain resource offsets is preconfigured on the UE; or sending indication information of the frequency domain resource offset of the first PUCCH to the UE by using a MAC CE, where the indication information of the frequency domain resource offset of the first PUCCH is used to indicate the frequency domain resource offset of the first PUCCH in a set of frequency domain resource offsets, the set of frequency domain resource offsets includes at least one candidate frequency domain resource offset, and the set of the frequency domain resource offsets is preconfigured on the UE.

For a description of the technical effects of the third aspect, refer to the description of the technical effects of the first aspect. Details are not described herein again.

According to a fourth aspect, UE is provided. The UE may include an obtaining module and a determining module. The obtaining module may be configured to obtain resource configuration information, where the resource configuration information includes a first hop resource of a first PUCCH, a frequency domain resource offset of the first PUCCH, and/or a bandwidth of a BWP used by the UE, and the first PUCCH is a PUCCH of the UE. The determining module may be configured to determine a second hop resource of the first PUCCH based on the resource configuration information.

In a first optional implementation of the fourth aspect, the determining module is specifically configured to determine the second hop resource of the first PUCCH based on the first hop resource of the first PUCCH and/or the frequency domain resource offset of the first PUCCH and according to one of a rule 1, a rule 2, and a rule 3.

In a second optional implementation of the fourth aspect, the obtaining module is specifically configured to perform at least one of the following operations:

receiving, by using a broadcast message, a system message, or RRC signaling, the frequency domain resource offset that is of the first PUCCH and that is sent by a base station;

receiving, by using DCI, the frequency domain resource offset that is of the first PUCCH and that is sent by a base station:

receiving, by using a MAC CE, the frequency domain resource offset that is of the first PUCCH and that is sent by a base station:

receiving, by using a broadcast message, a system message, or an RRC signaling, a set of frequency domain resource offsets that is sent by a base station, and receiving, by using DCI, indication information that is of the frequency domain resource offset of the first PUCCH and that is sent by the base station, where the set of frequency domain resource offsets includes at least one candidate frequency domain resource offset;

receiving, by using a broadcast message, a system message, or an RRC signaling, a set of frequency domain resource offsets that is sent by a base station, and receiving, by using a MAC CE, indication information that is of the frequency domain resource offset of the first PUCCH and that is sent by the base station, where the set of frequency domain resource offsets includes at least one candidate frequency domain resource offset;

receiving, by using DCI, indication information that is of the frequency domain resource offset of the first PUCCH and that is sent by a base station, where the indication information of the frequency domain resource offset of the first PUCCH is used to indicate the frequency domain resource offset of the first PUCCH in a set of frequency domain resource offsets, the set of frequency domain resource offsets includes at least one candidate frequency domain resource offset, and the set of the frequency domain resource offsets is preconfigured on the UE; and receiving, by using a MAC CE, indication information that is of the frequency domain resource offset of the first PUCCH and that is sent by a base station, where the indication information of the frequency domain resource offset of the first PUCCH is used to indicate the frequency domain resource offset of the first PUCCH in a set of frequency domain resource offsets, the set of frequency domain resource offsets includes at least one candidate frequency domain resource offset, and the set of the frequency domain resource offsets is preconfigured on the UE.

For a description of technical effects of the fourth aspect, refer to the description of the technical effects of the second aspect. Details are not described herein again.

In the first aspect to the fourth aspect, the resource configuration information may further include a frequency hopping position of the first PUCCH and/or a frequency hopping rule of the first PUCCH.

In this application, the base station may further configure the frequency hopping position of the first PUCCH and/or the frequency hopping rule of the first PUCCH for the UE, so that the UE may determine the second hop resource of the first PUCCH based on the resource configuration information.

In the first aspect to the fourth aspect, the frequency hopping position of the first PUCCH is an end position of a second PUCCH or a start position of a third PUCCH, and the second PUCCH and the third PUCCH are consecutive PUCCHs in time domain; and a length of the first PUCCH, a length of the second PUCCH, and a length of the third PUCCH meet one of the following conditions:

the length of the first PUCCH is a sum of the length of the second PUCCH and the length of the third PUCCH; or the length of the first PUCCH is a sum of an integer multiple of the length of the second PUCCH and an integer multiple of the length of the third PUCCH.

In this application, if the length of the first PUCCH is the sum of the length of the second PUCCH and the length of the third PUCCH, frequency hopping occurs on the first PUCCH at the end position of the second PUCCH or the start position of the third PUCCH. Therefore, a frequency domain resource used by the first PUCCH at a first hop is the same as a frequency domain resource of the second PUCCH, that is, the first PUCCH may multiplex the frequency domain resource of the second PUCCH at the first hop; and a frequency domain resource used by the first PUCCH at a second hop is the same as a frequency domain resource of the third PUCCH, that is, the first PUCCH may multiplex the frequency domain resource of the third PUCCH at the second hop. In this way, a same frequency domain resource may be multiplexed by different PUCCHs. From a perspective of multiplexing of a frequency domain resource, utilization of the frequency domain resource can be improved.

Further, when the length of the first PUCCH, the length of the second PUCCH, and the length of the third PUCCH meet the condition that the length of the first PUCCH is the sum of the integer multiple of the length of the second PUCCH and the integer multiple of the length of the third PUCCH, alternatively, the first PUCCH and the second PUCCH may multiplex a same frequency domain resource and the first PUCCH and the third PUCCH may multiplex a same frequency domain resource, thereby improving utilization of the frequency domain resource.

In the first aspect to the fourth aspect, the frequency hopping rule of the first PUCCH includes one of the following rules.

Rule 1: index2=$f(n\_BWP, index1)$+offset, where $f(n\_BWP, index1)$ represents a mirror function or a step function, index2 represents an index of the second hop resource of the first PUCCH, index2 indicates the second hop resource of the first PUCCH, index1 represents an index of the first hop resource of the first PUCCH, index1 indicates the first hop resource of the first PUCCH, n_BWP represents a total quantity of resource units included in the BWP used by the UE, and offset represents the frequency domain resource offset of the first PUCCH.

Further, the frequency domain resource indicated by index1 may be the same as the frequency domain resource of the second PUCCH, and the frequency domain resource indicated by index2 may be the same as the frequency domain resource of the third PUCCH.

Rule 2: index2=index1+offset, where index2 represents an index of the second hop resource of the first PUCCH, index2 indicates the second hop resource of the first PUCCH, index1 represents an index of the first hop resource of the first PUCCH, index1 represents the first hop resource of the first PUCCH, and offset represents the frequency domain resource offset of the first PUCCH.

Further, the frequency domain resource indicated by index1 may be the same as the frequency domain resource of the second PUCCH, and the frequency domain resource indicated by index2 may be the same as the frequency domain resource of the third PUCCH.

Rule 3: index2=$f(index1, n\_BWP)$, where $f(index1, n\_BWP)$ represents a mirror function, index2 represents an index of the second hop resource of the first PUCCH, index2 indicates the second hop resource of the first PUCCH, index1 represents an index of the first hop resource of the first PUCCH, index1 indicates the first hop resource of the first PUCCH, and n_BWP represents a total quantity of resource units included in the BWP used by the UE.

Further, the frequency domain resource indicated by index1 may be the same as the frequency domain resource of the second PUCCH, and the frequency domain resource indicated by index2 may be the same as the frequency domain resource of the third PUCCH.

In the first aspect to the fourth aspect, when the length of the first PUCCH is n times the length of the second PUCCH, and a start position or the end position of the second PUCCH is the same as the frequency hopping position of the first PUCCH, the frequency domain resource of the first PUCCH and the frequency domain resource of the second PUCCH are frequency domain resources in available frequency domain resources, and a distance between the frequency domain resource of the first PUCCH and the frequency domain resource of the second PUCCH is less than or equal to a preset threshold, where both the length of the first PUCCH and the length of the second PUCCH are $2^\sigma$, n≥1, σ≥0, and σ is an integer.

In this application, when the length of the first PUCCH is n times the length of the second PUCCH, the first PUCCH may multiplex the frequency domain resource of the second PUCCH. If the distance between the frequency domain resource of the first PUCCH and the frequency domain resource of the second PUCCH is comparatively short (to be specific, the distance between the frequency domain resource of the first PUCCH and the frequency domain resource of the second PUCCH is less than or equal to the preset threshold), in a frequency hopping process of the first PUCCH, only a comparatively small offset of a frequency domain resource is required, so that the frequency domain resource of the second PUCCH is multiplexed as the second hop resource of the first PUCCH to some extent. Because a quantity of bits of DCI that is used by the base station to send the frequency domain resource offset of the first PUCCH is limited (which is usually 1 or 2 bits), and the frequency domain resource of the first PUCCH and the frequency domain resource of the second PUCCH are frequency domain resources in the available frequency domain resources and the distance between the frequency domain resource of the first PUCCH and the frequency domain resource of the second PUCCH is less than or equal to the preset threshold, the frequency domain resource offset of the first PUCCH may be comparatively small. In this way, signaling overheads of the DCI, sent by the base station, for carrying the frequency domain resource offset of the first PUCCH by the base station can be reduced.

In the first aspect to the fourth aspect, when the length of the first PUCCH is n times the length of the second PUCCH, the frequency domain resource of the first PUCCH is the same as the frequency domain resource of the second PUCCH, where both the length of the first PUCCH and the length of the second PUCCH are $2^\sigma$, n≥1, σ≥0, and σ is an integer.

In this application, because the length of the first PUCCH is n times the length of the second PUCCH, the first PUCCH may multiplex the frequency domain resource of the second PUCCH. Based on this, the frequency domain resource of the first PUCCH and the frequency domain resource of the second PUCCH are configured to a same frequency domain resource. In this way, the first PUCCH and the second PUCCH may multiplex a same frequency domain resource, so that a multiplex ratio of a frequency domain resource of a PUCCH can be increased.

According to a fifth aspect, a base station is provided. The base station may include a processor and a memory coupled to the processor. The memory may be configured to store a computer instruction. When the base station runs, the processor executes the computer instruction stored in the memory, so that the base station performs the uplink control channel resource configuration method according to any one of the first aspect and the optional implementations of the first aspect.

According to a sixth aspect, a computer-readable storage medium is provided. The computer-readable storage medium may include a computer instruction, and when the computer instruction is run on a base station, the base station is enabled to perform the uplink control channel resource configuration method according to any one of the first aspect and the optional implementations of the first aspect.

According to a seventh aspect, a computer program product including a computer instruction is provided. When the computer program product is run on a base station, the base station is enabled to perform the uplink control channel resource configuration method according to any one of the first aspect and the optional implementations of the first aspect.

According to an eighth aspect, a base station is provided. The base station exists in a product form of a chip. A structure of the apparatus includes a processor and a memory. The memory is configured to be coupled to the processor. The memory may be configured to store a computer instruction. The processor is configured to execute the computer instruction stored in the memory, so that the base station performs the uplink control channel resource configuration method according to any one of the first aspect and the optional implementations of the first aspect.

For a description of technical effects of the fifth aspect to the eighth aspect, refer to the related description of the technical effects of the first aspect. Details are not described herein again.

According to a ninth aspect, UE is provided. The UE may include a processor and a memory coupled to the processor. The memory may be configured to store a computer instruction. When the UE runs, the processor executes the computer instruction stored in the memory, so that the UE performs the uplink control channel resource configuration method according to any one of the second aspect and the optional implementations of the second aspect.

According to a tenth aspect, a computer-readable storage medium is provided. The computer-readable storage medium may include a computer instruction, and when the computer instruction is run on the UE, the UE is enabled to perform the uplink control channel resource configuration method according to any one of the second aspect and the optional implementations of the second aspect.

According to an eleventh aspect, a computer program product including a computer instruction is provided. When the computer program product is run on UE, the UE is enabled to perform the uplink control channel resource configuration method according to any one of the second aspect and the optional implementations of the second aspect.

According to a twelfth aspect, UE is provided. The UE exists in a product form of a chip. A structure of the apparatus includes a processor and a memory. The memory is configured to be coupled to the processor. The memory may be configured to store a computer instruction. The processor is configured to execute the computer instruction stored in the memory, so that the UE performs the uplink control channel resource configuration method according to any one of the second aspect and the optional implementations of the second aspect.

For a description of technical effects of the ninth aspect to the twelfth aspect, refer to the related description of the technical effects of the second aspect. Details are not described herein again.

According to a thirteenth aspect, a communications system is provided. The communications system may include the base station in any one of the third aspect and the optional implementations of the third aspect, and the UE in any one of the fourth aspect and the optional implementations of the fourth aspect; or the communications system may include the base station in the fifth aspect and the UE in the ninth aspect.

For a description of related content and technical effects of the thirteenth aspect, refer to the related description of the related content and the technical effects of any one of the first aspect or possible implementations and any one of the second aspect or possible implementations. Details are not described herein again.

According to a fourteenth aspect, a resource configuration method is provided. The method may include: sending, by a base station, first indication information to UE, where the first indication information is used to indicate whether first DCI includes a field that is used to indicate first latency information. The first latency information may include information about a slot of a first latency (for example, position information of a start slot of an acknowledgment data packet that is sent to the base station by the UE) or information about an OFDM symbol of a first latency (for example, position information of a start OFDM symbol of an acknowledgment data packet that is sent to the base station by the UE).

The first latency is a time difference between a second time point and a first time point. The first time point is a time point at which the UE receives a data packet that is sent by the base station, and the second time point is a time point at which the UE replies to the base station with an acknowledgment data packet after the UE receives the data packet that is sent by the base station.

In a first optional implementation of the fourteenth aspect, the first indication information may be sent by using higher layer signaling, and the higher layer signaling may be any one or a combination of a broadcast message, a system message, or an RRC message. Alternatively, the first indication information may be sent by using DCI. For example, the first indication information may be sent by using one or a combination of DCI corresponding to a common physical downlink control channel, DCI of a group common control channel, or DCI of a specific downlink control channel of the UE.

In a second optional implementation of the fourteenth aspect, when the first indication information indicates that the first DCI includes the field that is used to indicate the first latency information, it indicates that the base station allocates an independent DCI bit to indicate the first latency information.

In a third optional implementation of the fourteenth aspect, when the first indication information indicates that the first DCI does not include the field that is used to indicate the first latency information, it indicates that the base station allocates no independent DCI bit to indicate the first latency information. In this case, the base station may directly configure the first latency information for the UE by using higher layer signaling; or the base station indicates the first latency information by using DCI that indicates a PUCCH resource in a set of PUCCH resources, that is, the base station uses a same DCI bit to indicate the PUCCH resource and the first latency information; or PUCCH resource information indicated by a DCI bit includes the first latency information. A PUCCH resource may be at least one of the following: a start position of a PUCCH, a frequency domain resource offset of the PUCCH, and the like.

According to a fifteenth aspect, a resource allocation method is provided. The method may include: receiving, by UE, first indication information sent by a base station, where the first indication information is used to indicate whether first DCI includes a field that is used to indicate first latency information. The first latency information may include information about a slot of a first latency (for example, position information of a start slot of an acknowledgment data packet that is sent to the base station by the UE) or information about an OFDM symbol of a first latency (for example, position information of a start OFDM symbol of an acknowledgment data packet that is sent to the base station by the UE).

The first latency is a time difference between a second time point and a first time point. The first time point is a time point at which the UE receives a data packet that is sent by the base station, and the second time point is a time point at which the UE replies to the base station with an acknowledgment data packet after the UE receives the data packet that is sent by the base station.

In a first optional implementation of the fifteenth aspect, the first indication information may be sent by using higher layer signaling, and the higher layer signaling may be any one or a combination of a broadcast message, a system message, or an RRC message. Alternatively, the first indication information may be sent by using DCI. For example, the first indication information may be sent by using one or a combination of DCI corresponding to a common physical downlink control channel, DCI of a group common control channel, or DCI of a specific downlink control channel of the UE.

In a second optional implementation of the fifteenth aspect, when the first indication information indicates that the first DCI includes the field that is used to indicate the first latency information, it indicates that the base station allocates an independent DCI bit to indicate the first latency information. In this case, after receiving the first indication information, the UE may directly parse the first DCI to obtain the first latency information.

In a third optional implementation of the fifteenth aspect, when the first indication information indicates that the first DCI does not include the field that is used to indicate the first latency information, it indicates that the base station allocates no independent DCI bit to indicate the first latency information. In this case, the UE may obtain the first latency information that is directly configured by the base station for the UE by using higher layer signaling; or the UE parses DCI that is used to indicate a PUCCH resource (where the DCI indicates both the PUCCH resource and the first latency information), and then determines, based on the DCI, the first latency information based on a set of resources configured by the base station for the UE by using higher layer signaling.

According to a sixteenth aspect, a base station is provided. The base station may include a processor and a memory coupled to the processor. The memory may be configured to store a computer instruction. When the base station runs, the processor executes the computer instruction stored in the memory, so that the base station performs the resource configuration method in any one of the fourteenth aspect and the optional implementations of the fourteenth aspect.

According to a seventeenth aspect, a computer-readable storage medium is provided. The computer-readable storage medium may include a computer instruction, and when the computer instruction is run on a base station, the base station is enabled to perform the resource configuration method in any one of the fourteenth aspect and the optional implementations of the fourteenth aspect.

According to an eighteenth aspect, a computer program product including a computer instruction is provided. When the computer program product is run on a base station, the base station is enabled to perform the resource configuration method in any one of the fourteenth aspect and the optional implementations of the fourteenth aspect.

According to a nineteenth aspect, a base station is provided. The base station exists in a product form of a chip. A structure of the apparatus includes a processor and a memory. The memory is configured to be coupled to the processor. The memory may be configured to store a computer instruction. The processor is configured to execute the computer instruction stored in the memory, so that the base station performs the resource configuration method in any one of the fourteenth aspect and the optional implementations of the fourteenth aspect.

According to a twentieth aspect, UE is provided. The UE may include a processor and a memory coupled to the processor. The memory may be configured to store a computer instruction. When the UE runs, the processor executes the computer instruction stored in the memory, so that the UE performs the resource configuration method in any one of the fifteenth aspect and the optional implementations of the fifteenth aspect.

According to a twenty-first aspect, a computer-readable storage medium is provided. The computer-readable storage medium may include a computer instruction, and when the computer instruction is run on UE, the UE is enabled to perform the resource configuration method in any one of the fifteenth aspect and the optional implementations of the fifteenth aspect.

According to a twenty-second aspect, a computer program product including a computer instruction is provided. When the computer program product is run on UE, the UE is enabled to perform the resource configuration method in any one of the fifteenth aspect and the optional implementations of the fifteenth aspect.

According to a twenty-third aspect, UE is provided. The UE exists in a product form of a chip. A structure of the apparatus includes a processor and a memory. The memory is configured to be coupled to the processor. The memory may be configured to store a computer instruction. The processor is configured to execute the computer instruction stored in the memory, so that the UE performs the resource configuration method in any one of the fifteenth aspect and the optional implementations of the fifteenth aspect.

DESCRIPTION OF EMBODIMENTS

The term "and/or" in this specification describes only an association relationship for describing associated objects and represents that three relationships may exist. For example, A and/or B may represent the following three cases: Only A exists, both A and B exist, and only B exists.

In the specification and claims in the embodiments of the present disclosure, the terms "first", "second", and the like are intended to distinguish between different objects but do not indicate a particular order of the objects. For example, a first PUCCH, a second PUCCH, and the like are used to distinguish between different PUCCHs, but are not used to describe a particular order of the PUCCHs.

The term "example", "for example", or the like in the embodiments of the present disclosure is used to represent giving an example, an illustration, or a description. Any embodiment or design scheme described as "example" or "for example" in the embodiments of the present disclosure should not be explained as being more preferred or having more advantages than another embodiment or design scheme. Exactly, use of the word "example", "for example", or the like is intended to describe a related concept in a specific manner.

In the descriptions of the embodiment of the present disclosure, unless otherwise specified, "a plurality of" means two or more. For example, a plurality of processing units mean two or more processing units, and a plurality of systems mean two or more systems.

Some concepts in an uplink control channel resource configuration method and an apparatus provided in the embodiments of the present disclosure are first described.

Bandwidth part: is referred to as BWP. For a 5G system, a beyond 4G system, or a post-LTE system, a plurality of BWPs can be supported. To be specific, one system bandwidth may be divided into a plurality of BWPs (which may be considered as a plurality of narrow bandwidths), and an operating bandwidth of UE may be one BWP. For example, a total bandwidth (which may be referred to as a system bandwidth) of a cell in which the UE operates is 100 M (Mega Hertz), and an operating bandwidth supported by the UE may be comparatively small, for example, 20 M. In this case, for a base station serving the cell, the base station may allocate 20 M from the 100 M bandwidth as the operating bandwidth of the UE, and the operating bandwidth may be referred to as a BWP or a carrier BWP. The BWP and the carrier BWP have a same physical meaning. For example, for a 100 M system bandwidth, the 100 M system bandwidth may be divided into a BWP1 of 20 M, a BWP2 of 30 M, and a BWP3 of 50 M based on a numerology (numerology) (including a series of parameters such as a subcarrier spacing, a symbol length, and a length of a cyclic prefix of a symbol).

Figure 1:
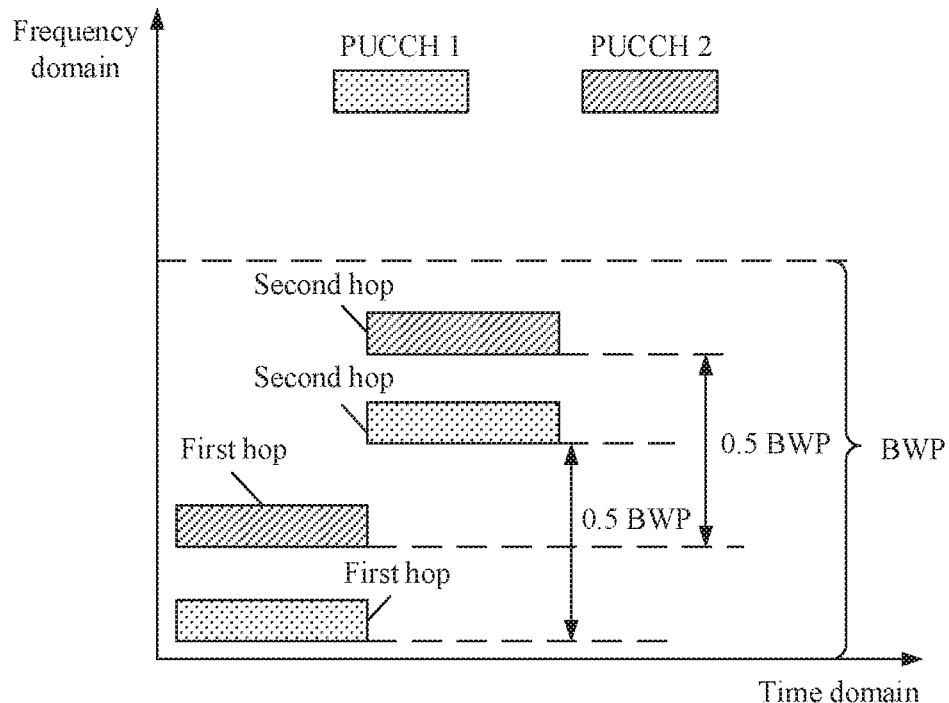
FIG. 1 is a schematic diagram of frequency hopping according to an embodiment of the present disclosure.
Figure 2:
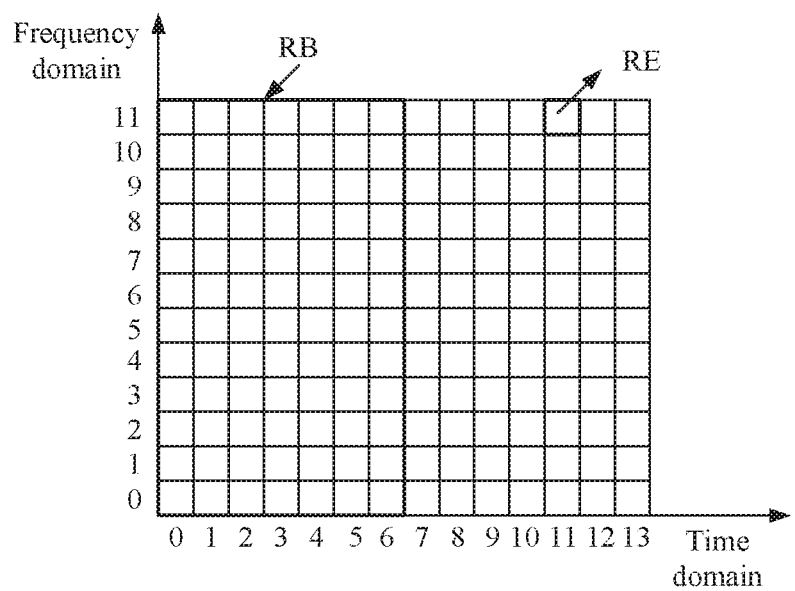
FIG. 2 is a schematic diagram of a time-frequency resource according to an embodiment of the present disclosure.

Time domain resource and frequency domain resource (time-frequency resource): In a 5G system, a time domain resource is measured in an orthogonal frequency division multiplexing (OFDM) symbol, a slot, a subframe, a frame, a mini-frame, a mini-slot, or the like; and a frequency domain resource is measured in a subcarrier, a subband, a resource element, a resource element group, a specific quantity of resource elements, or the like. For example, FIG. 2 is a schematic diagram of a time-frequency resource. In the example of FIG. 2, in time domain, one slot includes seven OFDM symbols (a quantity of OFDM symbols included in one slot is related to a value of a subcarrier spacing), or one slot includes 14 OFDM symbols. In FIG. 2, each column represents one OFDM symbol. In frequency domain, a subband includes several subcarriers. In FIG. 2, each row represents one subcarrier. As shown in FIG. 2, an RE resource element (RE) corresponds to one OFDM symbol in time domain, and corresponds to one subcarrier in frequency domain. A resource block (RB) corresponds to slots corresponding to a limited quantity of OFDM symbols (for example, corresponding to seven OFDM symbols) in time domain, and corresponds to 12 contiguous subcarriers in frequency domain.

In the embodiments of the present disclosure, a bandwidth of a BWP of the UE is evenly divided into a plurality of resource units (for example, the resource unit is an RB). It is assumed that the BWP is divided into 100 RBs. Correspondingly, in frequency domain, an index of each RB may indicate a frequency domain resource.

Frequency hopping means that a frequency domain resource on which a device operates changes. A PUCCH of UE is used as an example. The PUCCH operates on two different frequency domain resources in one slot. It is assumed that a length of the PUCCH (that is, OFDM symbols occupied by the PUCCH) is 8. One part (for example, the first four OFDM symbols) of the PUCCH may operate on a first frequency domain resource, and the other part (for example, the last four OFDM symbols) of the PUCCH operate on a second frequency domain resource. In this case, frequency hopping of the PUCCH occurs in one slot. That the PUCCH operates on the first frequency domain resource is referred to as a first hop, and that the PUCCH operates on the second frequency domain resource is referred to as a second hop. The first frequency domain resource and the second frequency domain resource may be referred to as hop resources. A position of an OFDM symbol on which the frequency domain of the PUCCH changes, is referred to as a frequency hopping position, and the frequency hopping position is a time domain position. For example, if frequency hopping occurs at an end position of a fourth OFDM symbol or a start position of a fifth OFDM symbol, the end position of the fourth OFDM symbol or the start position of the fifth OFDM symbol may be referred to as the frequency hopping position.

Based on the problem described in the background, in the uplink control channel resource configuration method provided in the embodiments of the present disclosure, a base station configures a frequency domain resource of a PUCCH for UE, to improve utilization of a frequency domain resource of an entire uplink channel of the UE.

Figure 3:
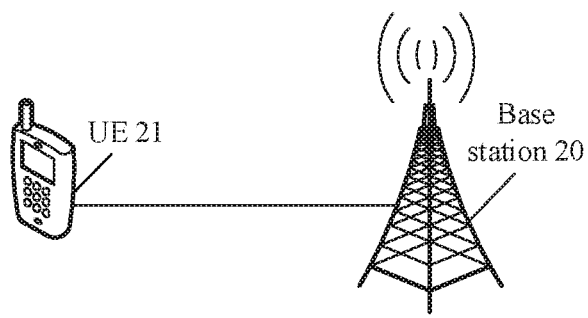
FIG. 3 is a schematic architectural diagram of a communications system according to an embodiment of the present disclosure.

The uplink control channel resource configuration method and the apparatus provided in the embodiments of the present disclosure may be applied to a wireless communications system. The wireless communications system may be an LTE system, an LTE-advanced (LTE-A) system, an NR system (that is, a 5G system), or the like. For example, the wireless communications system provided in the embodiments of the present disclosure is an NR system. FIG. 3 is a schematic architectural diagram of an NR system according to an embodiment of the present disclosure. In FIG. 3, the NR system includes a base station 20 and UE 21. The base station 20 may communicate with the UE 21 through downlink channels (including a PDCCH and a PDSCH) or uplink channels (a PUCCH and a PUSCH). The uplink control channel resource configuration method provided in the embodiments of the present disclosure is used to configure a frequency domain resource of the PUCCH.

Figure 4:
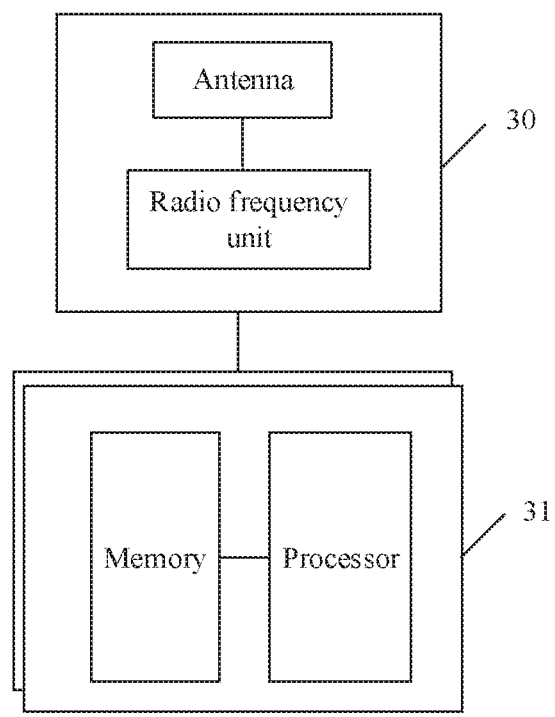
FIG. 4 is a schematic diagram of hardware of a base station according to an embodiment of the present disclosure.

The base station provided in this embodiment of the present disclosure may be a commonly used base station, an evolved node base station (eNB), a network device (for example, a next generation node base station (next generation node base station, gNB) in the NR system, or a new radio base station (new radio eNB), a macro base station, a micro base station, a high-frequency base station, a transmission and reception point (TRP), or the like. For example, in this embodiment of the present disclosure, the commonly used base station is used as an example to describe a hardware structure of the network device. The following describes various components of the base station in this embodiment of the present disclosure in detail with reference to FIG. 4. As shown in FIG. 4, the base station provided in this embodiment of the present disclosure may include a part 30 and a part 31. The part 30 is mainly configured to send and receive a radio frequency signal, and perform conversion between the radio frequency signal and a baseband signal. The part 31 is mainly configured to perform baseband processing, control the base station, and the like. The part 30 may be usually referred to as a transceiver unit, a transceiver, a transceiver circuit, a transceiver, or the like. The part 31 is usually a control center of the base station, may be usually referred to as a processing unit, and is configured to control the base station to perform steps performed by the base station in FIG. 4. For details, refer to the foregoing descriptions of the related parts.

The transceiver unit of the part 30 may also be referred to as a transceiver, a transceiver, or the like, and includes an antenna and a radio frequency unit. The radio frequency unit is mainly configured to perform radio frequency processing. Optionally, in the part 30, a component configured to implement a receiving function may be considered as a receiving unit, and a component configured to implement a sending function may be considered as a sending unit. In other words, the part 30 includes the receiving unit and the sending unit. The receiving unit may also be referred to as a receiver, a receiver, a receiver circuit, or the like. The sending unit may be referred to as a transmitter, a transmitter, a transmitter circuit, or the like.

The part 31 may include one or more boards. Each board may include one or more processors and one or more memories. The processor is configured to read and execute a program in the memory, to implement a baseband processing function and control the base station. If there are a plurality of boards, the boards may be interconnected to each other to enhance a processing capability. In an optional implementation, the plurality of boards may alternatively share one or more processors, or the plurality of boards share one or more memories, or the plurality of boards simultaneously share one or more processors. The memory and the processor may be integrated together, or may be disposed independently. In some embodiments, the part 30 and the part 31 may be integrated together or may be disposed independently. In addition, all functions of the part 31 may be integrated into one chip for implementation; or some functions may be integrated into one chip for implementation and other functions are integrated into one or more other chips for implementation. This is not limited in the embodiments of the present disclosure.

The UE provided in this embodiment of the present disclosure may be a mobile phone, a tablet computer, a notebook computer, an ultra-mobile personal computer (UMPC), a netbook or a personal digital assistant (PDA), a smart car, a sensor device, an internet of things (IoT) device, customer premise equipment (CPE), or the like.

Figure 5:
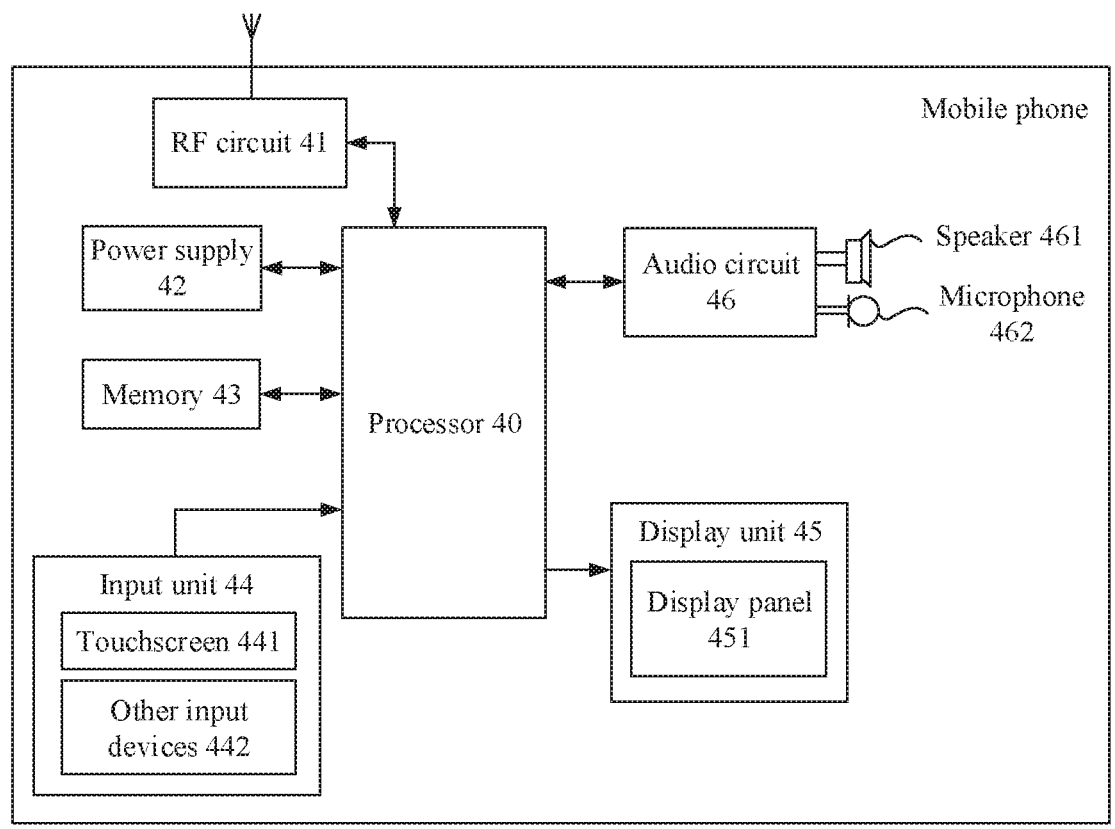
FIG. 5 is a schematic diagram of hardware of a mobile phone according to an embodiment of the present disclosure.

For example, in this embodiment of the present disclosure, an example in which the UE is a mobile phone is used to describe a hardware structure of the UE. The following describes various components of the mobile phone in this embodiment of the present disclosure in detail below with reference to FIG. 5. As shown in FIG. 5, the mobile phone provided in this embodiment of the present disclosure includes components such as a processor 40, a radio frequency (RF) circuit 41, a power source 42, a memory 43, an input unit 44, a display unit 45, and an audio circuit 46. A person skilled in the art may understand that the structure of the mobile phone shown in FIG. 5 constitutes no limitation on the mobile phone, and the mobile phone may include more or fewer components than those shown in FIG. 5, or may include a combination of some of the components shown in FIG. 5, or may include components arranged differently from those shown in FIG. 5.

The processor 40 is a control center of the mobile phone, and connects various parts of the entire mobile phone through various interfaces and lines. Various functions of the mobile phone and data processing are executed by running or executing a software program and/or a module stored in the memory 43 and by invoking data stored in the memory 43, to perform overall monitoring on the mobile phone. Optionally, the processor 40 may include one or more processing units. Optionally, an application processor and a modem processor may be integrated into the processor 40. The application processor mainly processes an operating system, a user interface, an application program, and the like; and the modem processor mainly processes wireless communication. It may be understood that the modem processor may be alternatively a processor existing separately from the processor 40.

The RF circuit 41 may be configured to send and receive a signal in an information receiving/sending process or a call process. For example, after receiving downlink information from a base station, the RF circuit 41 sends the downlink information to the processor 40 for processing, and sends uplink data to the base station. Generally, the RF circuit usually includes but is not limited to an antenna, at least one amplifier, a transceiver, a coupler, a low noise amplifier (LNA), a duplexer, and the like. In addition, the mobile phone may further implement wireless communication with another device in a network by using the RF circuit 41. Any communications standard or protocol may be used for the wireless communication, including but not limited to a global system for mobile communications (GSM), a general packet radio service (GPRS), code division multiple access (CDMA), wideband code division multiple access (WCDMA), LTE, an email, a short messaging service (SMS), and the like.

The power supply 42 may be configured to supply power to each component of the mobile phone, and the power supply 42 may be a battery. Optionally, the power supply may be logically connected to the processor 40 by using a power management system, to implement functions such as charging management, discharging management, and power consumption management by using the power management system.

The memory 43 may be configured to store a software program and/or a module. The processor 40 executes various function applications of the mobile phone and processes data by running the software program and/or the module stored in the memory 43. The memory 43 may mainly include a program storage area and a data storage area. The program storage area may store an operating system, an application program required by at least one function (such as an audio playing function or an image playing function), and the like. The data storage area may store data (such as audio data, image data, or an address book) created based on use of the mobile phone, and the like. Further, the memory 43 may include a high speed random access memory, or may include a nonvolatile memory such as at least one magnetic disk storage device, a flash memory device, or another volatile solid-state storage device.

The input unit 44 may be configured to receive entered number or character information, and generate a key signal input related to user setting and function control of the mobile phone. Specifically, the input unit 44 may include a touchscreen 441 and other input devices 442. The touchscreen 441, also referred to as a touch panel, may collect a touch operation (for example, an operation performed by a user on the touchscreen 441 or near the touchscreen 441 by using any appropriate object or accessory such as a finger or a stylus) performed by the user on or near the touchscreen 441, and drive a corresponding connected apparatus based on a preset program. Optionally, the touchscreen 441 may include two parts: a touch detection apparatus and a touch controller. The touch detection apparatus detects a touch orientation of the user, detects a signal generated by the touch operation, and transfers the signal to the touch controller. The touch controller receives touch information from the touch detection apparatus, converts the touch information into touch coordinates, then sends the touch coordinates to the processor 40, and can receive and execute a command sent by the processor 40. In addition, the touchscreen 441 may be implemented in a plurality of types such as a resistive type, a capacitive type, an infrared type, and a surface acoustic wave type. The other input devices 442 may include but are not limited to one or more of a physical keyboard, a function key (such as a volume control key and a power on/off key), a trackball, a mouse, a joystick, and the like.

The display unit 45 may be configured to display information entered by the user or information provided for the user, and various menus of the mobile phone. The display unit 45 may include a display panel 451. Optionally, the display panel 451 may be configured in a form of a liquid crystal display (LCD), an organic light-emitting diode (OLED), or the like. Further, the touchscreen 441 may cover the display panel 451. After detecting the touch operation on or near the touchscreen 441, the touchscreen 441 transfers the touch operation to the processor 40 to determine a type of a touch event. Then, the processor 40 provides a corresponding visual output on the display panel 451 based on the type of the touch event. In FIG. 5, the touchscreen 441 and the display panel 451 serve as two independent components to implement input and output functions of the mobile phone. However, in some embodiments, the touchscreen 441 and the display panel 451 may be integrated to implement the input and output functions of the mobile phone.

The audio circuit 46, a speaker 461, and a microphone 462 are configured to provide an audio interface between the user and the mobile phone. In one aspect, the audio circuit 46 may convert received audio data into an electrical signal, and transmit the electrical signal to the speaker 461; and the speaker 461 converts the electrical signal into a sound signal for output. In another aspect, the microphone 462 converts a collected sound signal into an electrical signal: and the audio circuit 46 receives the electrical signal, converts the electrical signal into audio data, and then outputs the audio data to the RF circuit 41 by using the processor 40, so that the audio data is sent to, for example, another mobile phone, or is output, by using the processor 40, the audio data to the memory 43 for further processing.

Optionally, the mobile phone shown in FIG. 5 may further include various sensors, for example, a gyroscope sensor, a hygrometer sensor, an infrared sensor, and a magnetometer sensor. Details are not described herein.

Optionally, the mobile phone shown in FIG. 5 may further include a Wi-Fi module, a Bluetooth module, and the like. Details are not described herein.

Figure 6:
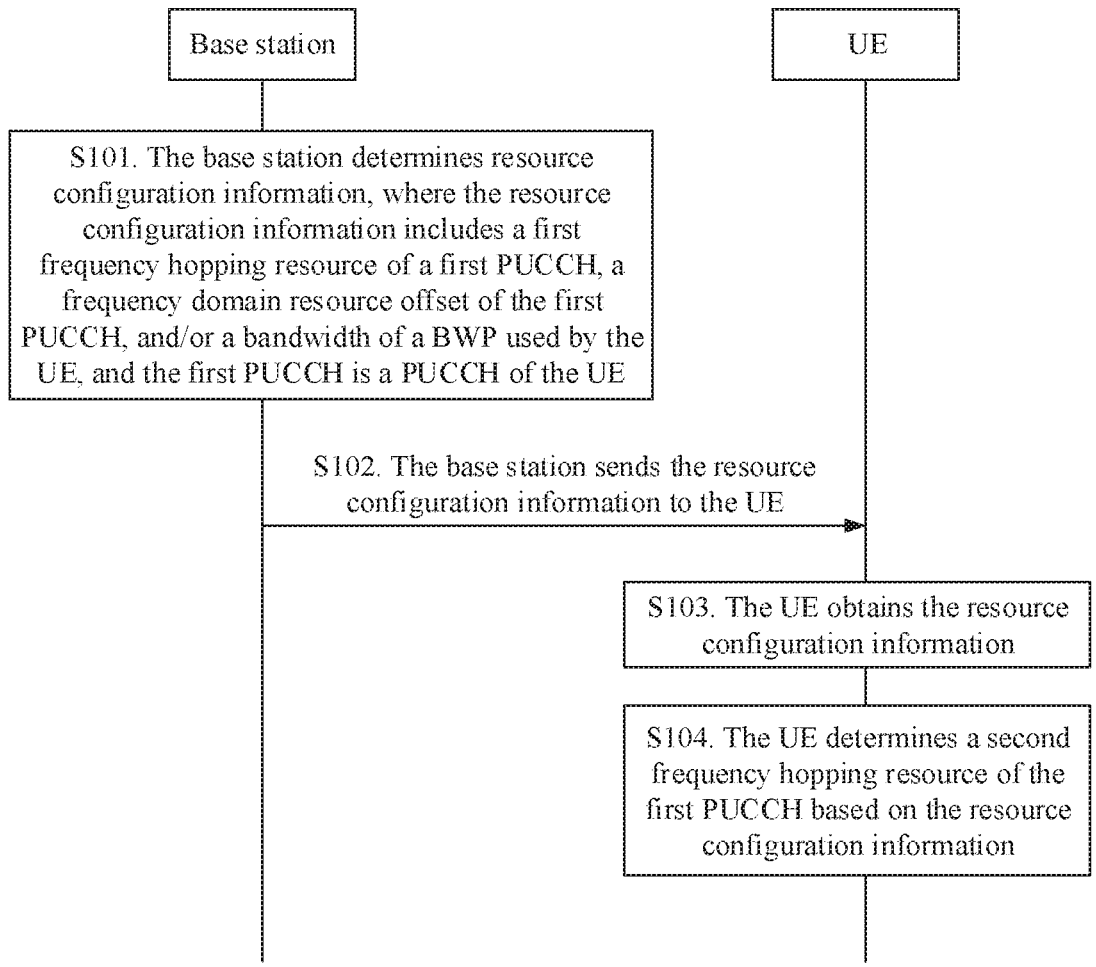
FIG. 6 is a schematic diagram of an uplink control channel resource configuration method according to an embodiment of the present disclosure.

With reference to FIG. 3, as shown in FIG. 6, an uplink control channel resource configuration method provided in this embodiment of the present disclosure may include S101 to S104.

S101. A base station determines resource configuration information, where the resource configuration information comprises a first hop resource of a first PUCCH, a frequency domain resource offset of the first PUCCH, and/or a bandwidth of a BWP used by UE, and the first PUCCH is a PUCCH of the UE.

In an NR system, the base station and the UE may send or receive information on a frequency band (that is, a frequency domain resource) by using an OFDM symbol. An OFDM symbol is a transmission resource unit in time domain, and the frequency domain resource (including a resource element, a resource block, or the like) is a transmission resource in frequency domain. In frequency domain, the PUCCH of the UE may use different frequency domain resources in one slot (that is, frequency hopping may occur on the PUCCH). If the first PUCCH uses two different frequency domain resources in one slot, that is, frequency hopping of the first PUCCH occurs once, a frequency domain resource before frequency hopping of the first PUCCH is referred to as the first hop resource, and a frequency domain resource after frequency hopping of the first PUCCH is referred to as a second hop resource.

It may be understood that frequency hopping of the first PUCCH in one slot can improve transmission quality of the PUCCH to some extent. For example, on the first hop resource, transmission quality of the PUCCH may be comparatively poor, the first PUCCH uses the second hop resource through frequency hopping, and transmission quality of the first PUCCH is improved on the second hop resource. In other words, the first PUCCH may obtain a frequency diversity gain.

In this embodiment of the present disclosure, the base station may configure, for the UE, a resource used by the UE to transmit uplink information. For example, the base station may allocate, to the UE, a length of the PUCCH (that is, the first PUCCH) of the UE, a start position of the first PUCCH, a frequency domain resource of the first PUCCH, and the like. In addition, when frequency hopping of the first PUCCH occurs once, the base station may determine the resource configuration information used for frequency hopping of the first PUCCH. Specifically, the base station may determine the first hop resource of the first PUCCH, the frequency domain resource offset of the first PUCCH, and/or the bandwidth of the BWP used by the UE.

The frequency domain resource offset of the first PUCCH and/or the bandwidth of the BWP used by the UE may be used to determine the second hop resource of the first PUCCH.

Optionally, in this embodiment of the present disclosure, the resource configuration information may further include a frequency hopping position of the first PUCCH and/or a frequency hopping rule of the first PUCCH, that is, the base station may send the frequency hopping position of the first PUCCH and/or the frequency hopping rule of the first PUCCH to the UE (which may be understood as that the base station configures the frequency hopping position of the first PUCCH and/or the frequency hopping rule of the first PUCCH for the UE).

In this embodiment of the present disclosure, when the base station sends the frequency hopping position of the first PUCCH and/or the frequency hopping rule of the first PUCCH to the UE, the base station may explicitly or implicitly send the frequency hopping position of the first PUCCH and/or the frequency hopping rule of the first PUCCH to the UE.

Optionally, in this embodiment of the present disclosure, the frequency hopping position of the first PUCCH and/or the frequency hopping rule of the first PUCCH may be preconfigured on the UE. For example, the base station and the UE agree on the frequency hopping position of the first PUCCH and/or the frequency hopping rule of the first PUCCH according to a protocol.

S102. The base station sends the resource configuration information to the UE.

S103. The UE obtains the resource configuration information.

In this embodiment of the present disclosure, that the UE obtains the resource configuration information may specifically include: The UE receives the resource configuration information sent by the base station.

Referring to the description of the resource configuration in S101, in this embodiment of the present disclosure, the resource configuration information may further include the frequency hopping position of the first PUCCH and/or the frequency hopping rule of the first PUCCH.

It should be noted that in this embodiment of the present disclosure, if the frequency hopping position of the first PUCCH and/or the frequency hopping rule of the first PUCCH are and/or is preconfigured (for example, specified in the protocol) on the UE, the UE obtains the frequency hopping position of the first PUCCH and/or the frequency hopping rule of the first PUCCH that are and/or is locally stored on the UE.

In this embodiment of the present disclosure, the frequency hopping position of the first PUCCH may be an end position of a second PUCCH or a start position of a third PUCCH, and the second PUCCH and the third PUCCH are consecutive PUCCHs in time domain.

A length of the first PUCCH, a length of the second PUCCH, and a length of the third PUCCH meet one of the following conditions.

Condition 1: The length of the first PUCCH is a sum of the length of the second PUCCH and the length of the third PUCCH.

For example, if the first PUCCH occupies x OFDM symbols, the second PUCCH occupies y1 OFDM symbols, and the third PUCCH occupies y2 OFDM symbols, $x=y1+y2$, where y1 may be equal to or unequal to y2.

Figure 7:
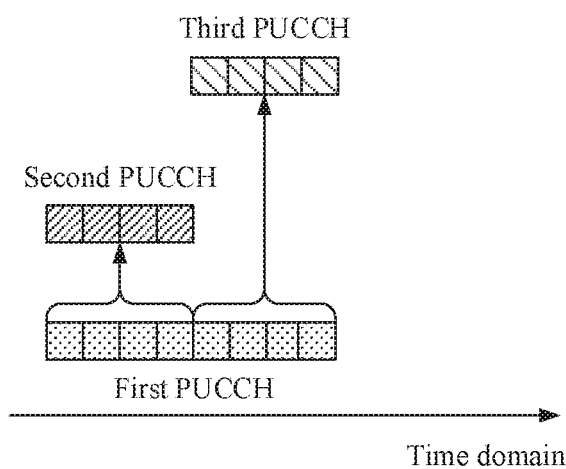
FIG. 7 is a schematic diagram of multiplexing of a frequency-domain resource according to an embodiment of the present disclosure.

As shown in FIG. 7, the first PUCCH occupies eight OFDM symbols, the second PUCCH occupies four OFDM symbols, and the third PUCCH also occupies four OFDM symbols. As shown in FIG. 7, it can be learned that the first PUCCH may multiplex a frequency domain resource of the second PUCCH at a first hop, and the first PUCCH may multiplex a frequency domain resource of the third PUCCH at a second hop.

In this embodiment of the present disclosure, if the length of the first PUCCH is the sum of the length of the second PUCCH and the length of the third PUCCH, frequency hopping occurs on the first PUCCH at the end position of the second PUCCH or the start position of the third PUCCH. Therefore, a frequency domain resource used by the first PUCCH at the first hop is the same as the frequency domain resource of the second PUCCH, that is, the first PUCCH may multiplex the frequency domain resource of the second PUCCH at the first hop; and a frequency domain resource used by the first PUCCH at the second hop is the same as the frequency domain resource of the third PUCCH, that is, the first PUCCH may multiplex the frequency domain resource of the third PUCCH at the second hop. In this way, different PUCCHs may multiplex a same frequency domain resource. From a perspective of multiplexing of a frequency domain resource, utilization of the frequency domain resource can be improved.

Condition 2: The length of the first PUCCH is a sum of an integer multiple of the length of the second PUCCH and an integer multiple of the length of the third PUCCH.

For example, if the first PUCCH occupies x OFDM symbols, the second PUCCH occupies y1 OFDM symbols, and the third PUCCH occupies y2 OFDM symbols, $x=a*y1+b*y2$, where a and b are both positive integers. For example, if x represents 12 OFDM symbols, y represents 4 OFDM symbols, and y2 represents 8 OFDM symbols, the length of the first PUCCH is a sum of a length of one second PUCCHs and a length of one third PUCCHs.

Likewise, when the length of the first PUCCH, the length of the second PUCCH, and the length of the third PUCCH meet the foregoing condition 2, alternatively, the first PUCCH and the second PUCCH may multiplex a same frequency domain resource, and the first PUCCH and the third PUCCH may multiplex a same frequency domain resource, thereby improving utilization of the frequency domain resource.

It should be noted that, in this embodiment of the present disclosure, the second PUCCH may be a PUCCH of specific UE (which may be referred to as first UE) or may be a PUCCH of another UE, and the third PUCCH may be a PUCCH of the first UE or may be a PUCCH of another UE. Specifically, the base station may select, according to an actual situation, a second PUCCH and a third PUCCH that multiplex same frequency domain resources with the UE. This is not limited in this embodiment of the present disclosure.

In this embodiment of the present disclosure, the frequency hopping rule of the first PUCCH is described in detail in the following process of determining the second hop resource of the first PUCCH.

S104. The UE determines a second hop resource of the first PUCCH based on the resource configuration information.

In this embodiment of the present disclosure, the UE may determine the second hop resource of the first PUCCH based on the first hop resource of the first PUCCH, the frequency domain resource offset of the first PUCCH, and/or the bandwidth of the BWP used by the UE in the resource configuration information that is obtained by the UE, so that frequency hopping occurs on the first PUCCH at a specified frequency hopping position based on the first hop resource and the second hop resource. In this way, the base station can configure a frequency domain resource for the PUCCH of the UE flexibly, so that the first PUCCH uses the configured frequency domain resource, and another frequency domain resource may be used for a PUSCH. This can improve utilization of the frequency domain resource to some extent.

Optionally, with reference to FIG. 6, in this embodiment of the present disclosure, in the process in which the base station sends the resource configuration information to the UE, the base station may send the frequency domain resource offset of the first PUCCH to the UE in a plurality of manners. Specifically, the base station may send the frequency domain resource offset of the first PUCCH to the UE in any one of the following manners P1 to P7.

P1. The base station sends the frequency domain resource offset of the first PUCCH to the UE by using a broadcast message, a system message, or RRC signaling.

In this embodiment of the present disclosure, after the base station determines the frequency domain resource offset of the first PUCCH, the base station may carry the frequency domain resource offset of the first PUCCH in the broadcast message, the system message, or the RRC signaling, and send the broadcast message, the system message, or the RRC signaling to the UE.

P2. The base station sends the frequency domain resource offset of the first PUCCH to the UE by using DCI.

In this embodiment of the present disclosure, after the base station determines the frequency domain resource offset of the first PUCCH, the base station may carry the frequency domain resource offset of the first PUCCH in the DCI, and send the DCI to the UE.

P3. The base station sends the frequency domain resource offset of the first PUCCH to the UE by using a MAC CE.

In this embodiment of the present disclosure, after the base station determines the frequency domain resource offset of the first PUCCH, the base station may carry the frequency domain resource offset of the first PUCCH in the MAC CE, and send the MAC CE to the UE.

P4. The base station sends a set of frequency domain resource offsets to the UE by using a broadcast message, a system message, or RRC signaling, and sends indication information of the frequency domain resource offset of the first PUCCH to the UE by using DCI.

The set of frequency domain resource offsets includes at least one candidate frequency domain resource offset.

P5. The base station sends a set of frequency domain resource offsets to the UE by using a broadcast message, a system message, or RRC signaling, and sends indication information of the frequency domain resource offset of the first PUCCH to the UE by using a MAC CE.

The set of frequency domain resource offsets includes at least one candidate frequency domain resource offset.

In this embodiment of the present disclosure, the base station may alternatively first send the set of frequency domain resource offsets of the UE to the UE in the manner P4 or P5, and then send the indication information to the UE, to instruct the UE to select, from the set of frequency domain resource offsets, the frequency domain resource offset indicated by the indication information. In this way, when the base station is to send the frequency domain resource offset to the UE next time, the base station may directly send the indication information of the frequency domain resource offset of the first PUCCH to the UE by using the DCI or the MAC CE, without a need of sending specific content of the frequency domain resource offset. In this way, a transmission resource for sending the resource configuration information can be saved.

P6. The base station sends indication information of the frequency domain resource offset of the first PUCCH to the UE by using DCI.

The indication information of the frequency domain resource offset of the first PUCCH is used to indicate the frequency domain resource offset of the first PUCCH in a set of frequency domain resource offsets, the set of frequency domain resource offsets includes at least one candidate frequency domain resource offset, and the set of frequency domain resource offsets is preconfigured on the UE.

P7. The base station sends indication information of the frequency domain resource offset of the first PUCCH to the UE by using a MAC CE.

The indication information of the frequency domain resource offset of the first PUCCH is used to indicate the frequency domain resource offset of the first PUCCH in a set of frequency domain resource offsets, the set of frequency domain resource offsets includes at least one candidate frequency domain resource offset, and the set of frequency domain resource offsets is preconfigured on the UE.

In this embodiment of the present disclosure, the set of frequency domain resource offsets may be preconfigured on the UE, and the set includes at least one candidate frequency domain resource offset. Then, the base station may send the indication information of the frequency domain resource offset of the first PUCCH to the UE by using the DCI or the MAC CE, to instruct the UE to select, from the set of frequency domain resource offsets, the frequency domain resource offset indicated by the indication information. In this way, when the base station is to send the frequency domain resource offset to the UE next time, the base station may directly send the indication information of the frequency domain resource offset of the first PUCCH to the UE by using the DCI or the MAC CE, without a need of sending specific content of the frequency domain resource offset. In this way, a transmission resource for sending the resource configuration information can be saved.

Optionally, in this embodiment of the present disclosure, the base station may send the frequency domain resource offset of the first PUCCH to the UE in any one of manners P1 to P7, and the UE may obtain (that is, receive) the frequency domain resource offset of the first PUCCH in a corresponding manner. Specifically, the UE may obtain the frequency domain resource offset of the first PUCCH in any one of manners Q1 to Q7.

Q1. The UE receives, by using the broadcast message, the system message, or the RRC signaling, the frequency domain resource offset that is of the first PUCCH and that is sent by the base station.

Q2. The UE receives, by using the DCI, the frequency domain resource offset that is of the first PUCCH and that is sent by the base station.

Q3. The UE receives, by using the MAC CE, the frequency domain resource offset that is of the first PUCCH and that is sent by the base station.

Q4. The UE receives, by using the broadcast message, the system message, or the RRC signaling, the set of frequency domain resource offsets that is sent by the base station, and receives, by using the DCI, the indication information that is of the frequency domain resource offset of the first PUCCH and that is sent by the base station.

The set of frequency domain resource offsets includes at least one candidate frequency domain resource offset.

Q5. The UE receives, by using the broadcast message, the system message, or the RRC signaling, the set of frequency domain resource offsets that is sent by the base station, and receives, by using the MAC CE, the indication information that is of the frequency domain resource offset of the first PUCCH and that is sent by the base station.

The set of frequency domain resource offsets includes at least one candidate frequency domain resource offset.

Q6. The UE receives, by using the DCI, the indication information that is of the frequency domain resource offset of the first PUCCH and that is sent by the base station.

The indication information of the frequency domain resource offset of the first PUCCH is used to indicate the frequency domain resource offset of the first PUCCH in the set of frequency domain resource offsets, the set of frequency domain resource offsets includes at least one candidate frequency domain resource offset, and the set of frequency domain resource offsets is preconfigured on the UE.

Q7. The UE receives, by using the MAC CE, the indication information that is of the frequency domain resource offset of the first PUCCH and that is sent by the base station.

The indication information of the frequency domain resource offset of the first PUCCH is used to indicate the frequency domain resource offset of the first PUCCH in the set of frequency domain resource offsets, the set of frequency domain resource offsets includes at least one candidate frequency domain resource offset, and the set of frequency domain resource offsets is preconfigured on the UE.

For related descriptions of Q1 to Q7, refer to the foregoing specific descriptions of P1 to P7. Details are not described herein again.

Optionally, with reference to FIG. 6, in this embodiment of the present disclosure, S104 may be specifically implemented by using S1041.

S1041. The UE determines the second hop resource of the first PUCCH based on the first hop resource of the first PUCCH and/or the frequency domain resource offset of the first PUCCH and according to one of the following rules: a rule 1, a rule 2, and a rule 3.

In this embodiment of the present disclosure, the foregoing rule 1, rule 2, and rule 3 are all frequency hopping rules of the first PUCCH. The following separately describes methods for determining, by the UE, the second hop resource of the first PUCCH in detail according to the rules.

Optionally, in this embodiment of the present disclosure, that the UE determines the second hop resource of the first PUCCH is specifically: The UE determines an index of the second hop resource of the first PUCCH, and may learn of the second hop resource based on the index of the second hop resource.

In this embodiment of the present disclosure, when the resource configuration information includes the frequency domain resource offset of the first PUCCH and the bandwidth of the BWP used by the UE, the UE determines the second hop resource of the first PUCCH according to the rule 1.

Rule 1: $index2 = f(n\_BWP, index1) + offset$, where $f(n\_BWP, index1)$ represents a mirror function or a step function, index2 represents the index of the second hop resource of the first PUCCH, index2 indicates the second hop resource of the first PUCCH, index1 represents an index of the first hop resource of the first PUCCH, index1 indicates the first hop resource of the first PUCCH, n_BWP represents a total quantity of resource units included in the BWP used by the UE, and offset represents the frequency domain resource offset of the first PUCCH.

Further, the frequency domain resource indicated by index1 may be the same as the frequency domain resource of the second PUCCH, and the frequency domain resource indicated by index2 may be the same as the frequency domain resource of the third PUCCH.

In this embodiment of the present disclosure, when $f(n\_BWP, index1)$ represents the mirror function, the mirror function may be as follows:

$$f(n\_BWP, index1) = n\_BWP - index1.$$

The mirror function is a function obtained by mirroring the first hop resource within the bandwidth of the BWP used by the UE. In this case, the index of the second hop resource of the first PUCCH may be as follows:

$$index2 = n\_BWP - index1 + offset.$$

A frequency hopping process of the first PUCCH may be understood as follows: The first PUCCH performs mirror frequency hopping based on the BWP of the UE, to ensure that a PUCCH is distributed at two ends of the BWP of the UE to some extent in the mirror frequency hopping manner. In this way, a middle part of the BWP may be used for a PUSCH, so that frequency domain resources of the PUSCH are contiguous, to improve utilization of a frequency domain resource of an uplink channel. A frequency domain resource after mirror frequency hopping of the first PUCCH may be multiplexed by another PUCCH. Therefore, after the mirror frequency hopping, the frequency domain resource is offset to some extent, and a new frequency domain resource is selected as the second hop resource of the first PUCCH. In this way, a conflict between frequency domain resources of different PUCCHs can be avoided, and accuracy of PUCCH resource configuration is improved.

Figure 8:
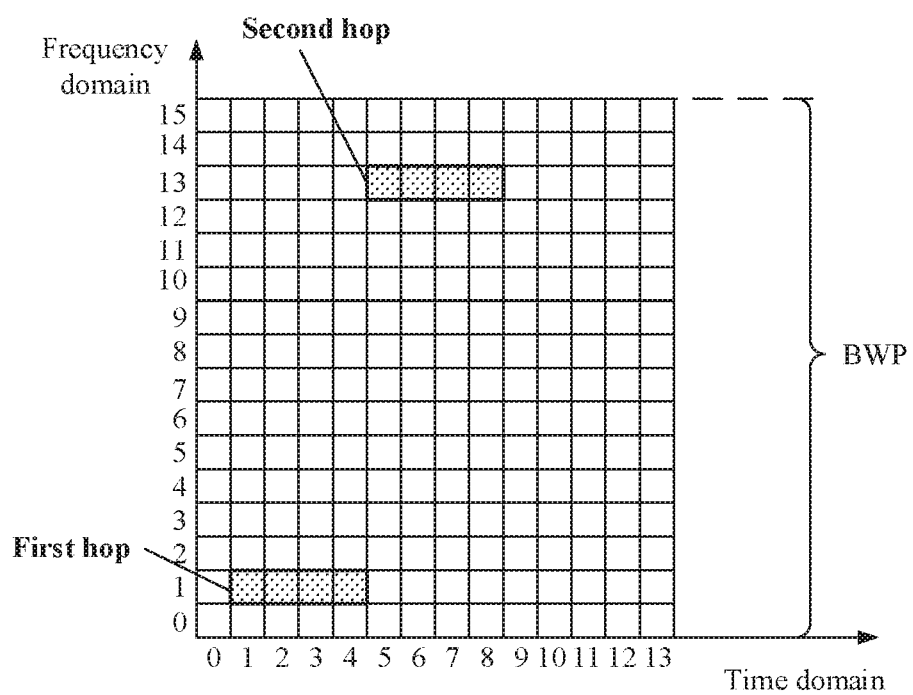
FIG. 8 is a schematic diagram of frequency hopping of a PUCCH according to an embodiment of the present disclosure.

For example, assuming that the bandwidth of the BWP used by the UE is divided into 16 parts (indexes are 0 to 15), that is, n_BWP is 15, that the index of the first hop resource is 1, that is, index1 is 1, and that the frequency domain resource offset of the first PUCCH is −1, the index of the second hop resource is 14. FIG. 8 is a schematic diagram of frequency hopping of the first PUCCH.

Optionally, when $f(n\_BWP, index1)$ represents the mirror function, the mirror function may be alternatively as follows:

$$index2 = n\_BWP - 1 - index1 + offset.$$

In this embodiment of the present disclosure, when $f(n\_BWP, index1)$ represents the step function, the function is a function related to index and a step that is calculated based on n_BWP. The step function may be as follows:

$$f(n\_BWP, index1) = \delta * n\_BWP + index1, \text{ where } 0 < \delta < 1,$$

and

δ represents a step factor, δ*n_BWP represents a frequency hopping step, and the index of the second hop resource of the first PUCCH may be as follows:

$$index2 = \delta * n\_BWP + index1 + offset.$$

The frequency hopping process of the first PUCCH may be understood as follows: Frequency hopping occurs on the first PUCCH by using δ*n_BWP as a frequency hopping step. Likewise, a frequency domain resource after frequency hopping occurs on the first PUCCH by using the step may be multiplexed by another PUCCH. Therefore, after the frequency hopping is performed by using the step, the frequency domain resource is offset to some extent, and a new frequency domain resource is selected as the second hop resource of the first PUCCH. In this way, a conflict between frequency domain resources of different PUCCHs can be avoided, and accuracy of PUCCH resource configuration is improved.

Optionally, in this embodiment of the present disclosure, a resource unit of the BWP may be one RB, or a specified quantity of RBs, or a specified quantity of REs. Specifically, the resource unit may be determined depending on an actual use requirement. This is not limited in this embodiment of the present disclosure.

In this embodiment of the present disclosure, when the resource configuration information includes the frequency domain resource offset of the first PUCCH, the UE determines the second hop resource of the first PUCCH according to the rule 2.

Rule 2: $index2 = index1 + offset$, where index2 represents the index of the second hop resource of the first PUCCH, index2 indicates the second hop resource of the first PUCCH, index1 represents an index of the first hop resource of the first PUCCH, index1 indicates the first hop resource of the first PUCCH, and offset represents the frequency domain resource offset of the first PUCCH.

Further, the frequency domain resource indicated by index1 may be the same as the frequency domain resource of the second PUCCH, and the frequency domain resource indicated by index2 may be the same as the frequency domain resource of the third PUCCH.

In this embodiment of the present disclosure, the second hop resource of the first PUCCH may be a frequency domain resource obtained after the first hop resource is appropriately offset.

In this embodiment of the present disclosure, when the resource configuration information includes the bandwidth of the BWP used by the UE, the UE determines the second hop resource of the first PUCCH according to the rule 3.

index2=$f$(index1,$n$_BWP), where       Rule 3:

f(index1, n_BWP) represents a mirror function, index2 represents the index of the second hop resource of the first PUCCH, index2 indicates the second hop resource of the first PUCCH, index1 represents an index of the first hop resource of the first PUCCH, index1 indicates the first hop resource of the first PUCCH, and n_BWP represents a total quantity of resource units included in the BWP used by the UE.

Further, the frequency domain resource indicated by index1 may be the same as the frequency domain resource of the second PUCCH, and the frequency domain resource indicated by index2 may be the same as the frequency domain resource of the third PUCCH.

In this embodiment of the present disclosure, if f(index1, n_BWP) is the same as the mirror function in the rule 1, the index of the second hop resource of the first PUCCH is as follows:

index2=$n$_BWP−index1.

The first PUCCH performs mirror frequency hopping based on the BWP of the UE. Similar to the mirror frequency hopping in the foregoing rule 1, this can ensure that a PUCCH is distributed at two ends of the BWP of the UE to some extent. In this way, a middle part of the BWP may be used for a PUSCH, so that frequency domain resources of the PUSCH are contiguous, to improve utilization of a frequency domain resource of an uplink channel.

Optionally, in this embodiment of the present disclosure, f(index1,n_BWP) may be alternatively a step function, and the step function may be the same as the step function in the foregoing rule 1, that is:

$f(n$_BWP,index1)=δ*$n$_BWP+index1.

In this case, the index of the second hop resource of the first PUCCH may be as follows:

index2=δ*$n$_BWP+index1.

Optionally, in this embodiment of the present disclosure, the frequency hopping rule may be alternatively as follows:

index2=$f(n$_BWP,index1,offset), where       Rule 4:

f(n_BWP, index1, offset) represents a function based on n_BWP, index1, and offset, index2 represents the index of the second hop resource of the first PUCCH, index2 indicates the second hop resource of the first PUCCH, index1 represents an index of the first hop resource of the first PUCCH, index1 indicates the first hop resource of the first PUCCH, n_BWP represents a total quantity of resource units included in the BWP used by the UE, and offset represents the frequency domain resource offset of the first PUCCH.

For example, the index of the second hop resource of the first PUCCH may be as follows:

index=δ*$n$_BWP+index1+ξ*offset, where ξ represents a scale factor.

f(n_BWP, index1, offset) may be f(f(n_BWP, index1), offset). f(n_BWP, index1) may represent the mirror function or the step function in the foregoing rule 1.

Optionally, in this embodiment of the present disclosure, in a process in which the base station configures a frequency domain resource for a PUCCH (that is, the base station determines the resource configuration information of the PUCCH), if the length of the first PUCCH is n times the length of the second PUCCH, and a start position or the end position of the second PUCCH is the same as the frequency hopping position of the first PUCCH, the frequency domain resource of the first PUCCH and the frequency domain resource of the second PUCCH are frequency domain resources in available frequency domain resources, and a distance between the frequency domain resource of the first PUCCH and the frequency domain resource of the second PUCCH is less than or equal to a preset threshold, where both the length of the first PUCCH and the length of the second PUCCH are $2^σ$, n≥1, σ≥0, and σ is an integer.

It may also be understood that frequency domain resources configured by the base station for the first PUCCH and the second PUCCH meet the following condition: The distance between the frequency domain resource of the first PUCCH and the frequency domain resource of the second PUCCH is less than or equal to the preset threshold.

Figure 9A:
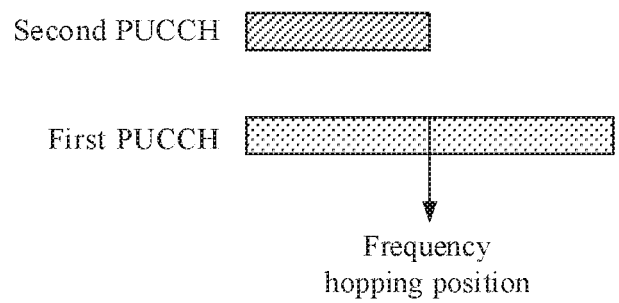
FIGS. 9(a) and 9(b) are schematic diagrams of frequency hopping positions of PUCCHs according to an embodiment of the present disclosure.
Figure 9B:
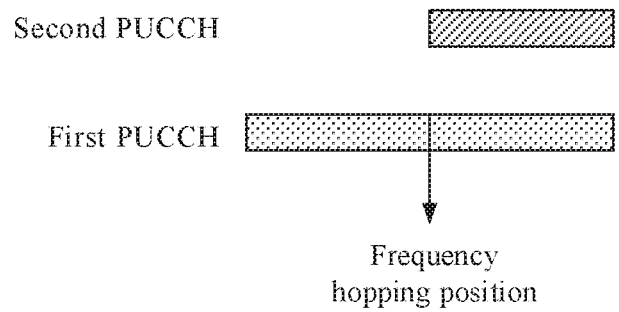

For example, as shown in FIG. 9($a$) and FIG. 9($b$), it is assumed that the first PUCCH occupies eight OFDM symbols, and the second PUCCH occupies four OFDM symbols. FIG. 9($a$) shows a case in which the end position of the second PUCCH is the same as the frequency hopping position of the first PUCCH, and FIG. 9($b$) shows a case in which the start position of the second PUCCH is the same as the frequency hopping position of the first PUCCH.

In this embodiment of the present disclosure, when the length of the first PUCCH is n times the length of the second PUCCH, the first PUCCH may multiplex the frequency domain resource of the second PUCCH. If the distance between the frequency domain resource of the first PUCCH and the frequency domain resource of the second PUCCH is comparatively short (to be specific, the distance between the frequency domain resource of the first PUCCH and the frequency domain resource of the second PUCCH is less than or equal to the preset threshold), in a frequency hopping process of the first PUCCH, only a comparatively small offset (offset) of the frequency domain resource is required, so that the frequency domain resource of the second PUCCH is multiplexed as the second hop resource of the first PUCCH to some extent. Because a quantity of bits of DCI that is used by the base station to send the frequency domain resource offset (that is, the offset) of the first PUCCH is limited (which is usually 1 to 2 bits), and the frequency domain resource of the first PUCCH and the frequency domain resource of the second PUCCH are frequency domain resources in the available frequency domain resources and the distance between the frequency domain resource of the first PUCCH and the frequency domain resource of the second PUCCH is less than or equal to the preset threshold, the frequency domain resource offset of the first PUCCH may be comparatively small. In this way, signaling overheads of the DCI, sent by the base station, for carrying the frequency domain resource offset of the first PUCCH by the base station can be reduced.

Optionally, in this embodiment of the present disclosure, in a process in which the base station configures a frequency domain resource for a PUCCH (that is, the base station determines the resource configuration information of the PUCCH), if the length of the first PUCCH is $2^n$ times the length of the second PUCCH, the frequency domain resource of the first PUCCH is the same as the frequency domain resource of the second PUCCH. In other words, the base station configures a same frequency domain resource for the first PUCCH and the second PUCCH.

In this embodiment of the present disclosure, because the length of the first PUCCH is n times the length of the second PUCCH (for example, the first PUCCH occupies eight OFDM symbols, and the second PUCCH occupies four OFDM symbols), the first PUCCH may multiplex the frequency domain resource of the second PUCCH. Based on this, the frequency domain resource of the first PUCCH and the frequency domain resource of the second PUCCH are configured to a same frequency domain resource. In this way, the first PUCCH and the second PUCCH may multiplex a same frequency domain resource, so that a multiplex ratio of the frequency domain resource of the PUCCH can be improved.

It should be noted that, in this embodiment of the present disclosure, the frequency domain resource of the first PUCCH may be the same as frequency domain resources of a plurality of PUCCHs. For example, the first PUCCH occupies eight OFDM symbols, the second PUCCH occupies two OFDM symbols, the third PUCCH occupies two OFDM symbols, and a fourth PUCCH occupies four OFDM symbols, the frequency domain resource of the first PUCCH may be the same as the frequency domain resource of the second PUCCH, the frequency domain resource of the third PUCCH, and a frequency domain resource of the fourth PUCCH (the second PUCCH, the third PUCCH, and the fourth PUCCH are consecutive PUCCHs in time domain). It is assumed that the index of the first hop resource of the first PUCCH is 5, that both the index of the frequency domain resource of the second PUCCH and the index of the third PUCCH are 5, that the index of the second hop resource of the first PUCCH is 95, and that an index of the frequency domain resource of the fourth PUCCH is 95. In this case, when frequency hopping of the first PUCCH occurs, the frequency hopping position of the first PUCCH is an end position of the fourth OFDM symbol or a start position of the fifth OFDM symbol, and the first PUCCH may use the frequency domain resource of the second PUCCH and the frequency domain resource of the third PUCCH at a first hop, and the first PUCCH may use the frequency domain resource of the fourth PUCCH at a second hop.

Optionally, in this embodiment of the present disclosure, the method for configuring the second hop resource of the first PUCCH may be similar to the method for configuring the frequency hopping resource of the first PUCCH, and is configured by the base station. The resource configuration information includes the index of the second hop resource of the first PUCCH.

According to the uplink control channel resource configuration method provided in this embodiment of the present disclosure, the base station may determine the resource configuration information that includes the first hop resource of the first PUCCH, the frequency domain resource offset of the first PUCCH, and/or the bandwidth of the BWP used by the UE, and send the resource configuration information to the UE. Then, after receiving the resource configuration information, the UE may determine the second hop resource of the first PUCCH based on the resource configuration information, where the first PUCCH is a PUCCH of the UE. In comparison with the prior art, because the base station may configure the frequency domain resource offset of the first PUCCH and/or the bandwidth of the BWP used by the UE for the first PUCCH, the UE may determine the second hop resource of the first PUCCH based on the frequency domain resource offset of the first PUCCH and/or the bandwidth of the BWP used by the UE, so that a frequency domain resource of the first PUCCH may be distributed at two ends of the BWP of the UE. It is ensured that frequency domain resources of a PUSCH are contiguous to some extent, thereby improving utilization of a frequency domain resource of an uplink channel.

An embodiment of the present disclosure further provides a resource configuration method. The method may include S201 to S203.

S201. A base station sends first indication information to UE, where the first indication information is used to indicate whether first DCI includes a field that is used to indicate first latency information.

In this embodiment of the present disclosure, the first latency information may include information about a slot of a first latency (for example, position information of a start slot of an acknowledgment data packet that is sent to the base station by the UE) or information about an OFDM symbol of a first latency (for example, position information of a start OFDM symbol of an acknowledgment data packet that is sent to the base station by the UE).

It should be noted that the acknowledgment data packet indicates whether a hybrid automatic repeat request HARQ of a data packet that is sent by the base station is correctly obtained or incorrectly obtained.

The first latency is a time difference between a second time point and a first time point. The first time point is a time point at which the UE receives a data packet that is sent by the base station, and the second time point is a time point at which the UE replies to the base station with an acknowledgment data packet after the UE receives the data packet that is sent by the base station.

It should be noted that, in this embodiment of the present disclosure, the first time point and the second time point may be measured in a slot, in an OFDM symbol, or a combination of a slot and an OFDM symbol (where the OFDM symbol is an OFDM symbol in the slot).

Optionally, the first indication information may be sent by using higher layer signaling, and the higher layer signaling may be any one or a combination of a broadcast message, a system message, or an RRC message. Alternatively, the first indication information may be sent by using DCI. For example, the first indication information may be sent by using one or a combination of DCI corresponding to a common physical downlink control channel, DCI of a group common control channel, or DCI of a specific downlink control channel of the UE.

Optionally, when the first indication information indicates that the first DCI includes the field that is used to indicate the first latency information, it indicates that the base station allocates a quantity of independent DCI bits to indicate the first latency information.

Optionally, when the first indication information indicates that the first DCI does not include the field that is used to indicate the first latency information, it indicates that the base station allocates no independent DCI bit to indicate the first latency information. In this case, the base station may directly configure the first latency information for the UE by using higher layer signaling; or the base station indicates the first latency information by using DCI that indicates a PUCCH resource in a set of PUCCH resources, that is, the base station uses a same DCI bit to indicate the PUCCH resource and the first latency information; or PUCCH resource information indicated by a DCI bit includes the first latency information. A PUCCH resource may be at least one of the following: a start position of a PUCCH, a frequency domain resource offset of the PUCCH, and the like.

S202. The UE receives the first indication information sent by the base station.

S203. The UE determines the first latency information based on the first indication information sent by the base station.

Optionally, in this embodiment of the present disclosure, when the first indication information indicates that the first DCI includes the field that is used to indicate the first latency information, after the UE receives the first indication information, the UE may directly parse the first DCI to obtain the first latency information.

Optionally, in this embodiment of the present disclosure, when the first indication information indicates that the first DCI does not include the field that is used to indicate the first latency information, the UE may obtain the first latency information that is directly configured by the base station for the UE by using higher layer signaling; or the UE parses DCI that is used to indicate a PUCCH resource (where the DCI indicates both the PUCCH resource and the first latency information), and then determines, based on the DCI, the first latency information based on a set of resources configured by the base station for the UE by using higher layer signaling.

According to the resource configuration method provided in this embodiment of the present disclosure, in a process of communication between the UE and the base station, after the UE receives a sent data packet, the UE needs to reply to the base station with an acknowledgment data packet of the data packet. In this embodiment of the present disclosure, the base station may send the first indication information to the UE, where the first indication information is used to notify the UE whether the first DCI includes the field that is used to indicate the first latency information, so that the UE determines, based on the first indication information, the first latency information that is used to send the acknowledgment data packet (the acknowledgment packet that is to be sent to the base station), so as to successfully send the acknowledgment data packet to the base station.

The foregoing mainly describes the solutions provided in the embodiments of the present disclosure from a perspective of interaction between network elements. It may be understood that, to implement the foregoing functions, each network element, for example, the base station or the UE, includes corresponding hardware structures and/or software modules for performing the functions. A person of ordinary skill in the art should be easily aware that, in combination with the examples described in the embodiments of the present disclosure, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of the present disclosure, the base station, the UE, and the like may be divided into functional modules according to the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of the present disclosure, division into modules is an example, is merely logical function division, and may be other division in an actual implementation.

Figure 10:
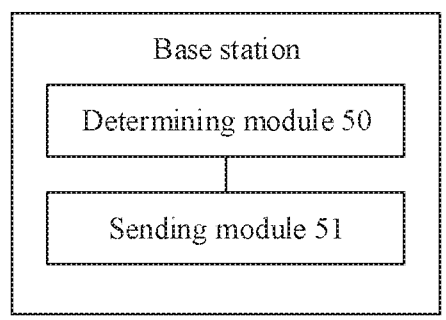
FIG. 10 is a schematic structural diagram 1 of a base station according to an embodiment of the present disclosure.

When each functional module is obtained through division based on each corresponding function, FIG. 10 is a possible schematic structural diagram of the base station in the foregoing embodiment. As shown in FIG. 10, the base station may include a determining module 50 and a sending module 51. The determining module 50 may be configured to support the base station in performing S101 in the foregoing method embodiment. The sending module 51 may be configured to support the base station in performing S102 in the foregoing method embodiment. All related content of the steps in the foregoing method embodiment may be cited in function descriptions of the corresponding functional modules. Details are not described herein again.

Figure 11:
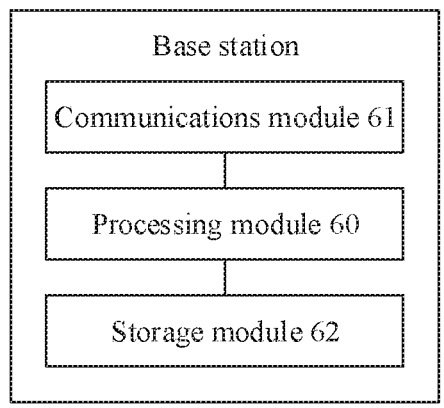
FIG. 11 is a schematic structural diagram 2 of a base station according to an embodiment of the present disclosure.

When an integrated unit is used, FIG. 11 is a possible schematic structural diagram of the base station in the foregoing embodiment. As shown in FIG. 11, the base station may include a processing module 60 and a communications module 61. The processing module 60 may be configured to control and manage an action of the base station. For example, the processing module 60 may be configured to support the base station in performing S101 in the foregoing method embodiment, and/or used in another process of the technology described in this specification. The communications module 61 may be configured to support the base station in communicating with another network entity. For example, the communications module 61 may be configured to support the base station in performing S102 in the foregoing method embodiment. Optionally, as shown in FIG. 11, the base station may further include a storage module 62, configured to store program code and data of the base station.

The processing module 60 may be a processor or a controller (for example, the processing module 60 may be the processor shown in FIG. 4). For example, the processing module 60 may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing module 60 may implement or execute various example logical blocks, modules, and circuits described with reference to content disclosed in the embodiments of the present disclosure. Alternatively, the processing module 60 may be a combination of processors implementing a computing function, for example, a combination that includes one or more microprocessors, or a combination of a DSP and a microprocessor. The communications module 61 may be a transceiver, a transceiver circuit, a communications interface, or the like (for example, the communications module 61 may be the radio frequency unit shown in FIG. 4). The storage module 62 may be a memory.

When the processing module 60 is a processor, the communications module 61 is a transceiver, and the storage module 62 is a memory, the processor, the transceiver, and the memory may be connected by using a bus. The bus may be a peripheral component interconnect (PCI) bus, an extended industry standard architecture (EISA) bus, or the like. The bus may be classified into an address bus, a data bus, a control bus, or the like.

Figure 12:
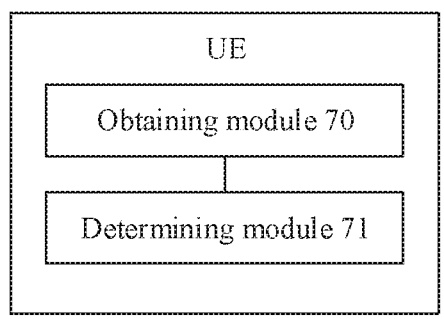
FIG. 12 is a schematic structural diagram 1 of UE according to an embodiment of the present disclosure.

When each functional module is obtained through division based on each corresponding function. FIG. 12 is a possible schematic structural diagram of the UE in the foregoing embodiment. As shown in FIG. 12, the UE may include an obtaining module 70 and a determining module 71. The obtaining module 70 may be configured to support the UE in performing S103 in the foregoing method embodiment. The determining module 71 may be configured to support the UE in performing S104 (including S1041) in the foregoing method embodiment. All related content of the steps in the foregoing method embodiment may be cited in function descriptions of the corresponding functional modules. Details are not described herein again.

Figure 13:
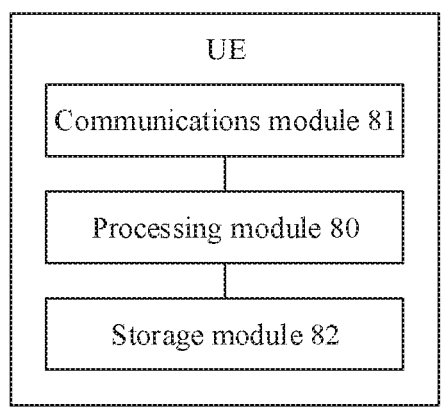
FIG. 13 is a schematic structural diagram 2 of UE according to an embodiment of the present disclosure.

When an integrated unit is used, FIG. 13 is a possible schematic structural diagram of the UE in the foregoing embodiment. As shown in FIG. 13, the UE may include a processing module 80 and a communications module 81. The processing module 80 may be configured to control and manage an action of the UE. For example, the processing module 80 may be configured to support the UE in performing S104 (including S1041) in the foregoing method embodiment, and/or used in another process of the technology described in this specification. The communications module 81 may be configured to support the UE in communicating with another network entity. For example, the communications module 81 may be configured to support the UE in performing S103 in the foregoing method embodiment. Optionally, as shown in FIG. 13, the UE may further include a storage module 82, configured to store program code and data of the UE.

The processing module 80 may be a processor or a controller (for example, the processing module 80 may be the processor 40 shown in FIG. 5). For example, the processing module 80 may be a CPU, a general-purpose processor, a DSP, an ASIC, an FPGA or another programmable logic device, a transistor logic device, a hardware component, or any combination thereof. The processing module 80 may implement or execute various example logical blocks, modules, and circuits described with reference to content disclosed in the embodiments of the present disclosure. Alternatively, the processing module 80 may be a combination of processors implementing a computing function, for example, a combination that includes one or more microprocessors, or a combination of a DSP and a microprocessor. The communications module 81 may be a transceiver, a transceiver circuit, a communications interface, or the like (for example, the communications module 81 may be the RF circuit 41 shown in FIG. 5). The storage module 82 may be a memory (for example, the storage module 82 may be the memory 43 shown in FIG. 5).

When the processing module 80 is a processor, the communications module 81 is a transceiver, and the storage module 82 is a memory, the processor, the transceiver, and the memory may be connected by using a bus. The bus may be a PCI bus, an EISA bus, or the like. The bus may be classified into an address bus, a data bus, a control bus, or the like.

When each functional module is obtained through division based on each corresponding function, the base station provided in this embodiment of the present disclosure may include a sending module. The sending module may be configured to support the base station in performing S201 in the foregoing method embodiment. All related content of the steps in the foregoing method embodiment may be cited in function descriptions of the corresponding functional modules. Details are not described herein again.

When an integrated unit is used, the base station may include a processing module and a communications module. The processing module may be configured to control and manage actions of the base station, and/or used in another process of the technology described in this specification. The communications module may be configured to support the base station in communicating with another network entity. For example, the communications module may be configured to support the base station in performing S201 in the foregoing method embodiment. Optionally, the base station may further include a storage module, configured to store program code and data of the base station.

The processing module may be a processor or a controller (for example, the processing module may be the processor shown in FIG. 4). For example, the processing module may be a CPU, a general-purpose processor, a DSP, an ASIC, an FPGA or another programmable logic device, a transistor logic device, a hardware component, or any combination thereof. The processing module may implement or execute various example logical blocks, modules, and circuits described with reference to content disclosed in the embodiments of the present disclosure. Alternatively, the processing module may be a combination of processors implementing a computing function, for example, a combination that includes one or more microprocessors, or a combination of a DSP and a microprocessor. The communications module may be a transceiver, a transceiver circuit, a communications interface, or the like (for example, the communications module may be the radio frequency unit shown in FIG. 4). The storage module may be a memory.

When the processing module is a processor, the communications module is a transceiver, and the storage module is a memory, the processor, the transceiver, and the memory may be connected by using a bus. The bus may be a PCI bus, an EISA bus, or the like. The bus may be classified into an address bus, a data bus, a control bus, or the like.

When each functional module is obtained through division based on each corresponding function, the UE provided in this embodiment of the present disclosure may include a receiving module and a determining module. The receiving module may be configured to support the UE in performing S202 in the foregoing method embodiment. The determining module may be configured to support the UE in performing S203 in the foregoing method embodiment. All related content of the steps in the foregoing method embodiment may be cited in function descriptions of the corresponding functional modules. Details are not described herein again.

When an integrated unit is used, the UE may include a processing module and a communications module. The processing module may be configured to control and manage an action of the UE. For example, the processing module may be configured to support the UE in performing S203 in the foregoing method embodiment, and/or used in another process of the technology described in this specification. The communications module may be configured to support the UE in communicating with another network entity. For example, the communications module may be configured to support the UE in performing S202 in the foregoing method embodiment. Optionally, the UE may further include a storage module, configured to store program code and data of the UE.

The processing module may be a processor or a controller (for example, the processing module may be the processor 40 shown in FIG. 5). For example, the processing module may be a CPU, a general-purpose processor, a DSP, an ASIC, an FPGA or another programmable logic device, a transistor logic device, a hardware component, or any combination thereof. The processing module may implement or execute various example logical blocks, modules, and circuits described with reference to content disclosed in the embodiments of the present disclosure. Alternatively, the processing module may be a combination of processors implementing a computing function, for example, a combination that includes one or more microprocessors, or a combination of a DSP and a microprocessor. The communications module may be a transceiver, a transceiver circuit, a communications interface, or the like (for example, the communications module may be the RF circuit 41 shown in FIG. 5). The storage module may be a memory (for example, the storage module may be the memory 43 shown in FIG. 5).

When the processing module is a processor, the communications module is a transceiver, and the storage module is a memory, the processor, the transceiver, and the memory may be connected by using a bus. The bus may be a PCI bus, an EISA bus, or the like. The bus may be classified into an address bus, a data bus, a control bus, or the like.

All or some of the foregoing embodiments may be implemented by using software, hardware, firmware, or any combination thereof in the foregoing embodiments. When a software program is used to implement the embodiments, all or some of the embodiments may be implemented in a form of a computer program product. The computer program product includes one or more computer instructions. When the computer instructions are loaded and executed on the computer, all or some of the procedures or functions according to the embodiments of the present disclosure are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a magnetic disk, or a magnetic tape), an optical medium (for example, a digital video disc (DVD)), a semiconductor medium (for example, a solid state drive (SSD)), or the like.

The foregoing description about implementations allows a person skilled in the art to understand that, for ease of description and brevity, division into the foregoing functional modules is used as an example for description. In an actual application, the foregoing functions may be assigned to different modules and implemented based on a requirement. In other words, an inner structure of an apparatus is divided into different functional modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. An uplink control channel resource determining method, comprising:
   obtaining resource configuration information, wherein the resource configuration information is used to configure at least one of a first hop resource of a first uplink control channel (PUCCH), a frequency domain resource offset of the first PUCCH, or a bandwidth of a bandwidth part (BWP); and
   determining a second hop resource of the first PUCCH based on the resource configuration information, wherein the second hop resource and the first hop resource meets the following rule:

$index2 = f(n\_BWP, index1, offset)$, wherein $f(n\_BWP, index1, offset) = f(f(n\_BWP, index1), offset)$; and $f(n\_BWP, index1) = n\_BWP - index1$ wherein index2 represents an index of the second hop resource, index1 indicates an index of the first hop resource, n_BWP represents a total quantity of resource units included in the BWP, and offset represents the frequency domain resource offset of the first PUCCH.

2. The method according to claim 1, wherein the determining a second hop resource of the first PUCCH further comprises:
determining the second hop resource of the first PUCCH according to the first hop resource of the first PUCCH, the frequency domain resource offset of the first PUCCH and the rule.

3. An apparatus, comprising:
one or more processors, and
a non-transitory storage medium in communication with the one or more processors, the non-transitory storage medium storing instructions, wherein, when executed by the one or more processors, the instructions cause the apparatus to perform:
obtaining resource configuration information, wherein the resource configuration information is used to configure at least one of a first hop resource of a first uplink control channel (PUCCH), a frequency domain resource offset of the first PUCCH, or a bandwidth of a bandwidth part (BWP); and
determining a second hop resource of the first PUCCH based on the resource configuration information, wherein the second hop resource and the first hop resource meets the following rule:

$index2 = f(n\_BWP, index1, offset)$, wherein $f(n\_BWP, index1, offset) = f(f(n\_BWP, index1), offset)$; and $f(n\_BWP, index1) = n\_BWP - index1$ wherein index2 represents an index of the second hop resource, index1 indicates an index of the first hop resource, n_BWP represents a total quantity of resource units included in the BWP, and offset represents the frequency domain resource offset of the first PUCCH.

4. The apparatus according to claim 3, wherein the determining a second hop resource further comprises determining the second hop resource of the first PUCCH according to the first hop resource of the first PUCCH, the frequency domain resource offset of the first PUCCH and the rule.

5. An uplink control channel resource configuration method, comprising:
determining resource configuration information, wherein the resource configuration information indicates at least one of a first hop resource of a first uplink control channel (PUCCH), a frequency domain resource offset of the first PUCCH, or a bandwidth of a bandwidth part (BWP); and
sending the resource configuration information to user equipment (UE),
wherein the resource configuration information further indicates a second hop resource of the first PUCCH, the second hop resource and the first hop resource meets the following rule:

$index2 = f(n\_BWP, index1, offset)$, wherein $f(n\_BWP, index1, offset) = f(f(n\_BWP, index1), offset)$; and $f(n\_BWP, index1) = n\_BWP - index1$ wherein index2 represents an index of the second hop resource, index1 indicates an index of the first hop resource, n_BWP represents a total quantity of resource units included in the BWP, and offset represents the frequency domain resource offset of the first PUCCH.

6. An apparatus, comprising:
one or more processors, and
a non-transitory storage medium in communication with the one or more processors, the non-transitory storage medium storing instructions, wherein, when executed by the one or more processors, the instructions cause the apparatus to perform:
determining resource configuration information, wherein the resource configuration information indicates at least one of a first hop resource of a first uplink control channel (PUCCH), a frequency domain resource offset of the first PUCCH, or a bandwidth of a bandwidth part (BWP); and
sending the resource configuration information to user equipment (UE),
wherein the resource configuration information further indicates a second hop resource of the first PUCCH, the second hop resource and the first hop resource meets the following rule:

$index2 = f(n\_BWP, index1, offset)$, wherein $f(n\_BWP, index1, offset) = f(f(n\_BWP, index1), offset)$; and $f(n\_BWP, index1) = n\_BWP - index1$ wherein index2 represents an index of the second hop resource, index1 indicates an index of the first hop resource, n_BWP represents a total quantity of resource units included in the BWP, and offset represents the frequency domain resource offset of the first PUCCH.

* * * * *